(12) United States Patent
Matsuda et al.

(10) Patent No.: US 10,627,216 B2
(45) Date of Patent: Apr. 21, 2020

(54) IMAGE PROCESSING APPARATUS

(71) Applicant: Keyence Corporation, Osaka (JP)

(72) Inventors: Hajime Matsuda, Osaka (JP); Masashi Nakao, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 16/245,266

(22) Filed: Jan. 11, 2019

(65) Prior Publication Data
US 2019/0293409 A1  Sep. 26, 2019

(30) Foreign Application Priority Data

Mar. 22, 2018 (JP) ................................ 2018-054925

(51) Int. Cl.
| | |
|---|---|
| G01B 11/06 | (2006.01) |
| G01B 11/25 | (2006.01) |
| G01N 21/956 | (2006.01) |
| G01N 21/88 | (2006.01) |

(52) U.S. Cl.
CPC .......... *G01B 11/0608* (2013.01); *G01B 11/25* (2013.01); *G01N 21/8851* (2013.01); *G01N 21/95607* (2013.01); *G01N 2021/8887* (2013.01)

(58) Field of Classification Search
CPC ..... G01B 11/0608; G01B 11/25; G01B 11/06; G01N 21/8851; G01N 21/95607; G01N 2021/8887

USPC .......................................................... 356/625
See application file for complete search history.

(56) References Cited

U.S. PATENT DOCUMENTS

| | | | | |
|---|---|---|---|---|
| 6,509,559 | B1 * | 1/2003 | Ulrich .................... | G01B 11/25 250/237 G |
| 10,529,082 | B2 * | 1/2020 | Miyata .................. | G06T 7/0002 |
| 2006/0077398 | A1 * | 4/2006 | Cantin ................... | G01B 11/25 356/512 |
| 2008/0165357 | A1 * | 7/2008 | Stern ................. | G01B 11/0608 356/364 |
| 2017/0370706 | A1 * | 12/2017 | Nakatsukasa .......... | G01B 11/08 |

FOREIGN PATENT DOCUMENTS

JP            2015-021764 A       2/2015

\* cited by examiner

*Primary Examiner* — Roy M Punnoose
(74) *Attorney, Agent, or Firm* — Kilyk & Bowersox, P.L.L.C.

(57) ABSTRACT

Based on a plurality of first pattern images, a first angle image with each pixel having irradiation angle information of first measuring pattern lights on the measurement object is generated, and based on a plurality of second pattern images, a second angle image with each pixel having irradiation angle information of second measuring pattern lights on the measurement object is generated. In accordance with the irradiation angle information of each pixel in the first angle image, the irradiation angle information of each pixel in the second angle image, and relative position information of a first light projection unit and a second light projection unit, the height of the measurement object in a direction of a central axis of a lighting device is measured.

7 Claims, 20 Drawing Sheets

MEASUREMENT OBJECT: RECTANGULAR PARALLELEPIPED BOX

PHASE SHIFT PATTERN IMAGE

FIRST LED
FIRST LCD

FIG. 17
MEASUREMENT OBJECT:
RECTANGULAR PARALLELEPIPED BOX
FIRST LED
FIRST LCD
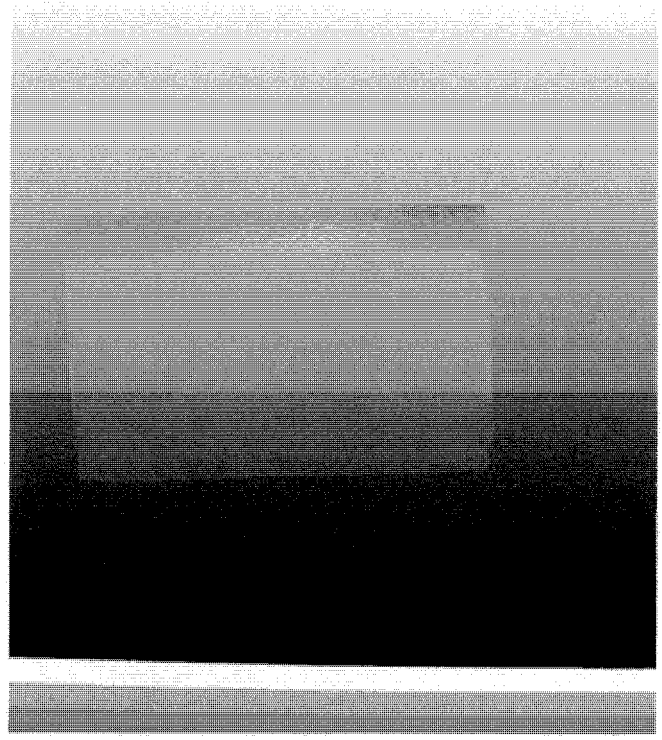
INTERMEDIATE IMAGE (ABSOLUTE PHASE IMAGE)
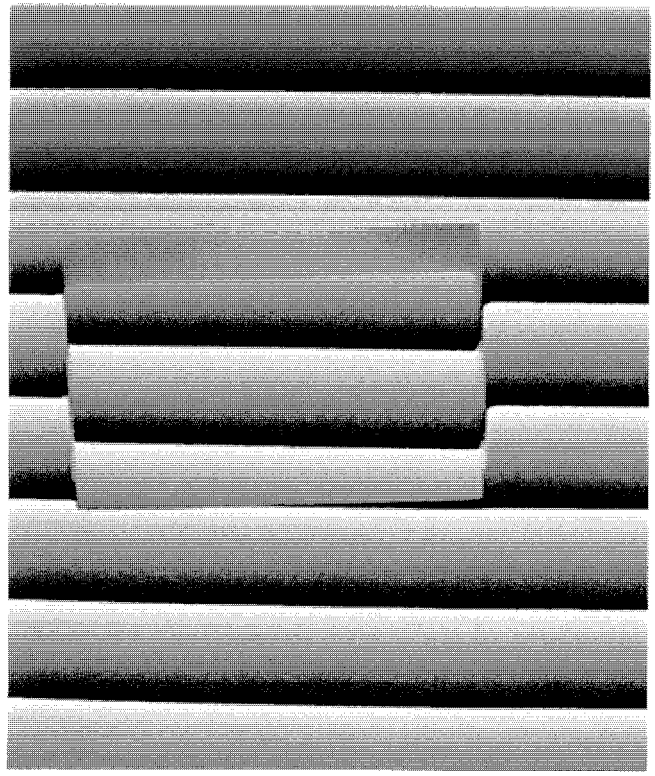
PHASE SHIFT IMAGE

MEASUREMENT OBJECT:
RECTANGULAR PARALLELEPIPED BOX

PHASE SHIFT PATTERN IMAGE

SECOND LED
SECOND LCD

FIG. 19
MEASUREMENT OBJECT:
RECTANGULAR PARALLELEPIPED BOX
SECOND LED
SECOND LCD
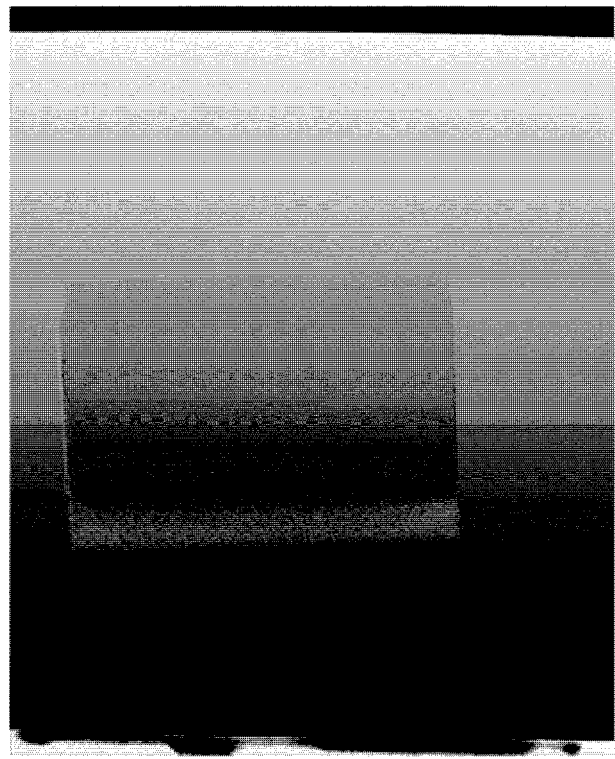
INTERMEDIATE IMAGE (ABSOLUTE PHASE IMAGE)
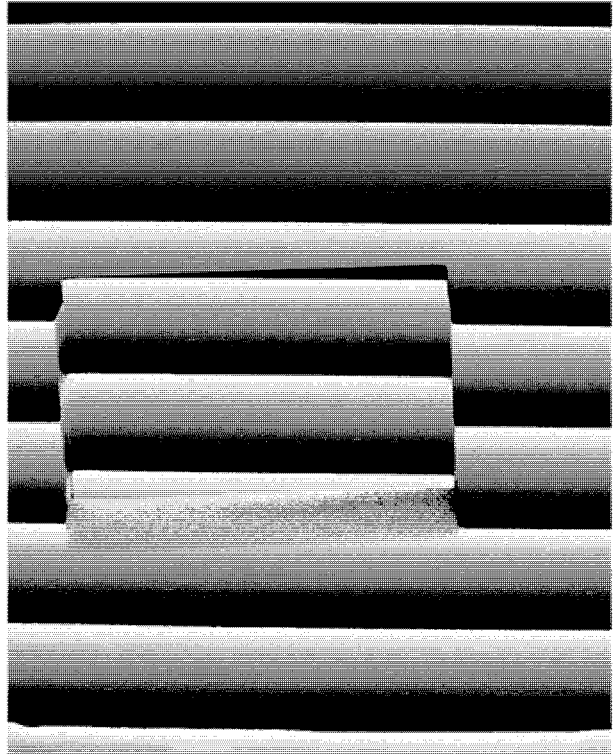
PHASE IMAGE FIG. 20
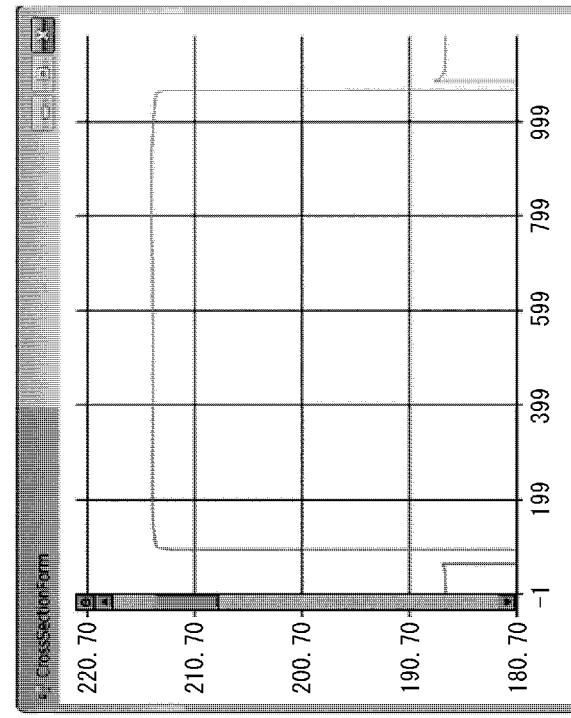
CROSS-SECTIONAL PROFILE
MEASUREMENT OBJECT:
RECTANGULAR PARALLELEPIPED BOX
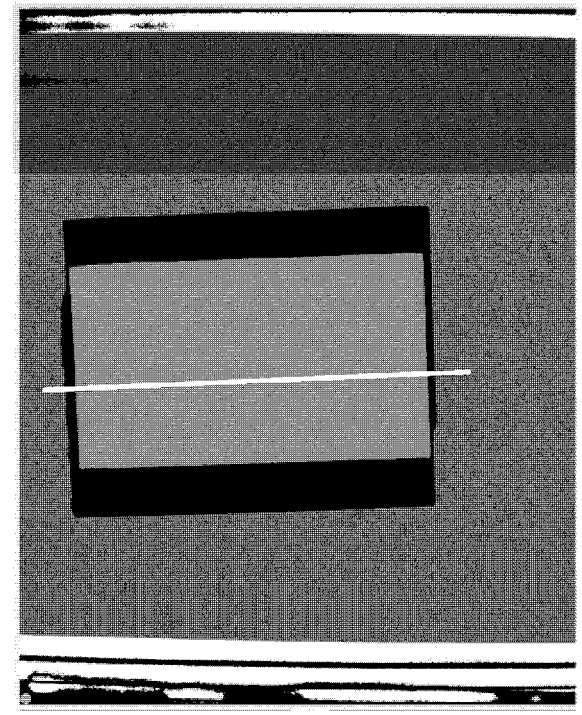
HEIGHT IMAGE

IMAGE PROCESSING APPARATUS

CROSS-REFERENCE TO RELATED APPLICATIONS

The present application claims foreign priority based on Japanese Patent Application No. 2018-054925, filed Mar. 22, 2018, the contents of which is incorporated herein by reference.

BACKGROUND OF THE INVENTION

1. Field of the Invention

The present invention relates to an image processing apparatus including a lighting device that irradiates a measurement object with light and an imaging device that receives the light reflected from the measurement object, and particularly belongs to a technical field of a structure in which the lighting device and the imaging device are separated.

2. Description of Related Art

For example, at a production site, an image processing apparatus as disclosed in Japanese Patent Application Laid-Open No. 2015-21764 may be introduced for the purpose of automating inspection and saving labor. The image processing apparatus of Japanese Patent Application Laid-Open No. 2015-21764 is a three-dimensional image processing apparatus capable of acquiring a distance image including height information of an inspection object and performing image processing based on the distance image, and includes a head portion and a controller.

The head portion is provided integrally with a light projection device for projecting a predetermined pattern light for measuring a shape, and an imaging device for capturing an image of the measurement object on which the pattern light has been projected. In this image processing apparatus, a distance image is generated based on the pattern projection image acquired by the imaging device, and is further converted into a grayscale image in which the height information at each pixel of the distance image has been replaced with luminance, and based on this grayscale image, inspection processing such as edge detection and area calculation of a predetermined region.

Generally, a method of capturing an image of a measurement object onto which a pattern light has been projected to obtain height information is called a pattern projection method. As the pattern projection method, a phase shift method is known in which a pattern light obtained by varying an illuminance distribution in, for example, in a sinusoidal form is varied and then an image of the pattern light is captured every time. A space code method is also known in which a space irradiated with light is divided into a large number of small spaces and the small spaces are numbered with a series of space code numbers to expand the range of measurement allowable height.

SUMMARY OF THE INVENTION

Meanwhile, the pattern projection method using the phase shift method or the space code method is based on the principle of triangulation distance measurement, and there is often used an apparatus in which, as in the head portion of the image processing apparatus in Japanese Patent Application Laid-Open No. 2015-21764, the light projection device and the imaging device are strictly position such that the relative positions thereof are not displaced.

However, that the lighting device and the imaging device are integrated and the relative positions of the lighting device and the imaging device are not displaced means that the lighting device and the imaging device cannot be separately installed at the time of installation. This greatly reduces the flexibility at the time of installation and hinders the introduction of the image processing apparatus to all production sites and the like. Furthermore, there is also a problem that when the user already has, for example, a general-purpose imaging device, the imaging device cannot be utilized.

In view of this, it is conceivable to separate the lighting device and the imaging device, but when the lighting device and the imaging device are separated from each other, the user needs to set the positions by himself or herself for calibration so that the measurement using the triangulation distance measurement is possible at the time of installation of the apparatus, whereby the burden on the user during installation is large.

The present invention has been made in view of the points described above, and an object of the present invention is to make an apparatus easily installable without increasing a burden on a user at the time of installation, and further enabling measurement of an absolute shape of a measurement object, while forming an apparatus configuration with high flexibility at the time of installation.

In order to achieve the above object, the present invention is an image processing apparatus for measuring a height of a measurement object, the apparatus being provided with: a lighting device including a first light projection unit provided with a first light source that emits diffused light, and a first pattern light generation unit that sequentially generates a plurality of first measuring pattern lights having different patterns by receiving diffused light emitted from the first light source, to irradiate the measurement object with the first measuring pattern lights, a second light projection unit provided with a second light source that emits diffused light, and a second pattern light generation unit that sequentially generates a plurality of second measuring pattern lights having different patterns by receiving diffused light emitted from the second light source, to irradiate the measurement object with the second measuring pattern lights, and a housing that includes an opening at a center and integrally supports the first light projection unit and the second light projection unit in a state where the first light projection unit and the second light projection unit are separated from each other in a circumferential direction of the opening; an imaging device that is provided separately from the lighting device, receives the first measuring pattern lights reflected from the measurement object through the opening of the housing to generate a plurality of first pattern images, and receives the second measuring pattern lights reflected from the measurement object through the opening of the housing to generate a plurality of second pattern images; an angle image generation unit that generates a first angle image with each pixel having irradiation angle information of the first measuring pattern lights on the measurement object based on the plurality of first pattern images, and a second angle image with each pixel having irradiation angle information of the second measuring pattern lights on the measurement object based on the plurality of second pattern images; and a height measurement unit that measures a height of the measurement object in a direction of the central axis of the lighting device in accordance with irradiation angle information of each pixel in the first angle image and irradiation angle information of each pixel in the second angle image generated by the angle image generation unit, and relative position information of the first light projection unit and the second light projection unit in the housing.

With this configuration, when the first pattern light generation unit receives diffused light emitted from the first light source, sequentially a plurality of first measuring pattern lights having different patterns, and irradiates the measurement object with the first measuring pattern lights, and the imaging device receives the first measuring pattern lights reflected from the measurement object and generates a plurality of first pattern images. When the second pattern light generation unit receives diffused light emitted from the second light source, sequentially a plurality of second measuring pattern lights having different patterns, and irradiates the measurement object with the second measuring pattern lights, and the imaging device receives the second measuring pattern lights reflected from the measurement object and generates a plurality of second pattern images.

Based on the plurality of first pattern images and second pattern images, the angle image generation unit generates a first angle image with each pixel having irradiation angle information of the first measuring pattern lights on the measurement object based on the plurality of first pattern images, and a second angle image with each pixel having irradiation angle information of the second measuring pattern lights on the measurement object based on the plurality of second pattern images.

Since the relative positions of the first light projection unit and the second light projection unit in the housing are known, irrespective of the relative positional relation between the imaging device and the lighting device, it is possible to measure a height of the measurement object in the direction of the central axis of the lighting device in accordance with relative position information of the relative position, irradiation angle information of each pixel in the first angle image generated by the angle image generation unit, and irradiation angle information of each pixel in the second angle image. This eliminates the need for calibration relating to the installation of the imaging device and the lighting device.

That is, according to the present invention, when the lighting device and the imaging device are provided separately so as to be separately installable and to increase the flexibility at the time of installation, the absolute shape of the measurement object can be measured even without strict adjustment of the position of the imaging device with respect to the lighting device, so that the burden on the user at the time of installation does not increase.

In another invention, the pattern changes in a one-dimensional direction, and the first light source is made up of a plurality of light emitting diodes and arranged so as to be aligned in a direction parallel to a direction in which the pattern changes.

With this configuration, it is possible to form a linear light source extending in a direction parallel to the direction in which the pattern changes by the plurality of light emitting diodes. Note that the second light source can also be configured similarly by a plurality of light emitting diodes.

In still another invention, the lighting device further includes a third light projection unit provided with a third light source that emits diffused light, and a third pattern light generation unit that sequentially generates a plurality of third measuring pattern lights having different patterns by receiving diffused light emitted from the third light source, to irradiate the measurement object with the third measuring pattern lights, and a fourth light projection unit provided with a fourth light source that emits diffused light, and a fourth pattern light generation unit that sequentially generates a plurality of fourth measuring pattern lights having different patterns by receiving diffused light emitted from the fourth light source, to irradiate the measurement object with the fourth measuring pattern lights, the third light projection unit and the fourth light projection unit are integrally supported by the housing in a state of being separated from each other in a circumferential direction of the central axis, the imaging device receives the third measuring pattern lights reflected from the measurement object through the opening of the housing to generate a plurality of third pattern images, and receives the fourth measuring pattern lights reflected from the measurement object through the opening of the housing to generate a plurality of fourth pattern images, the angle image generation unit generates a third angle image with each pixel having irradiation angle information of the third measuring pattern lights on the measurement object based on the plurality of third pattern images, and a fourth angle image with each pixel having irradiation angle information of the fourth measuring pattern lights on the measurement object based on the plurality of fourth pattern images, and the height measurement unit measures a height of the measurement object in a direction of the central axis of the lighting device in accordance with irradiation angle information of each pixel in the third angle image and irradiation angle information of each pixel in the fourth angle image generated by the angle image generation unit, and relative position information of the third light projection unit and the fourth light projection unit in the housing.

With this configuration, the third light projection unit and the fourth light projection unit irradiate the measurement object with the third measuring pattern lights and the fourth measuring pattern lights, and the imaging device receives the third measuring pattern lights reflected from the measurement object, generates a plurality of third pattern images, and receives the fourth measuring pattern lights reflected from the measurement object to generate a plurality of fourth pattern images. Based on the plurality of third pattern images and fourth pattern images, the angle image generation unit generates a third angle image with each pixel having irradiation angle information of the third measuring pattern lights on the measurement object based on the plurality of third pattern images, and a fourth angle image with each pixel having irradiation angle information of the fourth measuring pattern lights on the measurement object based on the plurality of fourth pattern images.

Since the relative positions of the third light projection unit and the fourth light projection unit in the housing are known, as described, above, it is possible to measure the height of the measurement object in the direction of the central axis of the lighting device irrespective of the relative positional relation between the imaging device and the lighting device.

According to the present invention, the measurement object can be irradiated by the third light projection unit and the fourth light projection unit from a direction different from the direction of irradiation with the measuring pattern lights by the first light projection unit and the second light projection unit. Hence such a portion as is shadowed in the direction of irradiation with the measuring pattern lights by the first light projection unit and the second light projection unit can be irradiated with the measuring pattern lights by the third light projection unit and the fourth light projection unit, and ineffective pixels in the angle image can be reduced.

Note that the third light source and the fourth light source can also be made up of a plurality of light emitting diodes and arranged so as to be aligned in a direction intersecting the light emitting direction.

In still another invention, an irradiation mode switching unit is provided which is capable of switching between 1-1) a first irradiation mode in which irradiation is performed with the first measuring pattern lights and the second measuring pattern lights respectively by the first light projection unit and the second light projection unit, and 1-2) a second irradiation mode in which irradiation is performed with the first measuring pattern lights, the second measuring pattern lights, the third measuring pattern lights, and the fourth measuring pattern lights, respectively by the first light projection unit, the second light projection unit, the third light projection unit, and the fourth light projection unit.

With this configuration, it is possible to select the first irradiation mode when the height measurement is to be finished in a short time, and select the second irradiation mode when the height measurement is to be performed with higher accuracy.

In still another invention, the irradiation mode switching unit is configured to be also able to make switching to a third irradiation mode in which irradiation is performed with the third measuring pattern lights and the fourth measuring pattern lights respectively by the third light projection unit and the fourth light projection unit.

With this configuration, by using the third irradiation mode, it is possible to irradiate the measurement object with the pattern light from a direction different from the first irradiation mode, and select the irradiation direction in which the shadow of the pattern light is hardly formed. This leads to reduction in number of blind spots that cannot be measured, and improvement in reliability of the measurement results.

In still another invention, the height measurement unit is configured to generate a first height image representing a height of the measurement object in accordance with irradiation angle information of each pixel in the first angle image and the irradiation angle information of each pixel in the second angle image, and relative position information of the first light projection unit and the second light projection unit in the housing, and a second height image representing the height of the measurement object in accordance with irradiation angle information of each pixel in the third angle image and the irradiation angle information of each pixel in the fourth angle image, and relative position information of the third light projection unit and the fourth light projection unit in the housing, and the image processing apparatus further includes an image synthesis unit that synthesizes the first height image and the second height image to generate a synthesized height image.

That is, for example, such a portion as is shadowed in the direction of the irradiation with the measuring pattern lights by the first light projection unit and the second light projection unit may exist as ineffective pixels in the first height image. Likewise, in the direction of irradiation with the measuring pattern lights by the third light projection unit and the fourth light projection unit, the second height image may exist as ineffective pixels. In the present invention, by using the difference between the direction of irradiation with the measuring pattern lights by the first light projection unit and the second light projection unit and the direction of irradiation with the measuring pattern lights by the third light projection unit and the fourth light projection unit, it is possible to mutually interpolate the ineffective pixels existing in the first height image and the ineffective pixels existing in the second height image and reduce the ineffective pixels in the synthesized height image.

In still another invention, the lighting device includes a light projection control unit that controls the first light projection unit and the second light projection unit to sequentially generate the plurality of first measuring pattern lights and the plurality of second measuring pattern lights.

According to the present invention, while providing the lighting device and the imaging device separately from each other to form an apparatus configuration with high flexibility at the time of installation, it is possible to easily install the apparatus without increasing the burden on the user at the time of installation, and further to measure an absolute shape of a measurement object.

BRIEF DESCRIPTION OF THE DRAWINGS

FIG. 17 is a view showing a relative phase image obtained based on the phase shift pattern image set shown in FIG. 16, and an intermediate image corresponding to the phase shift pattern image set shown in FIG. 16;

FIG. 19 is a view showing a relative phase image obtained based on the phase shift pattern image set shown in FIG. 18, and an intermediate image corresponding to the phase shift pattern image set shown in FIG. 18; and FIG. 20 is a view showing a height image in the case of the measurement object being a rectangular parallelepiped box, and a user interface displaying a cross-sectional profile.

DETAILED DESCRIPTION OF PREFERRED EMBODIMENT

Hereinafter, embodiments of the present invention will be described in detail with reference to the drawings. The following description of preferred embodiments is merely illustrative in nature and is not intended to limit the present invention, its application, or its use.

Figure 1:
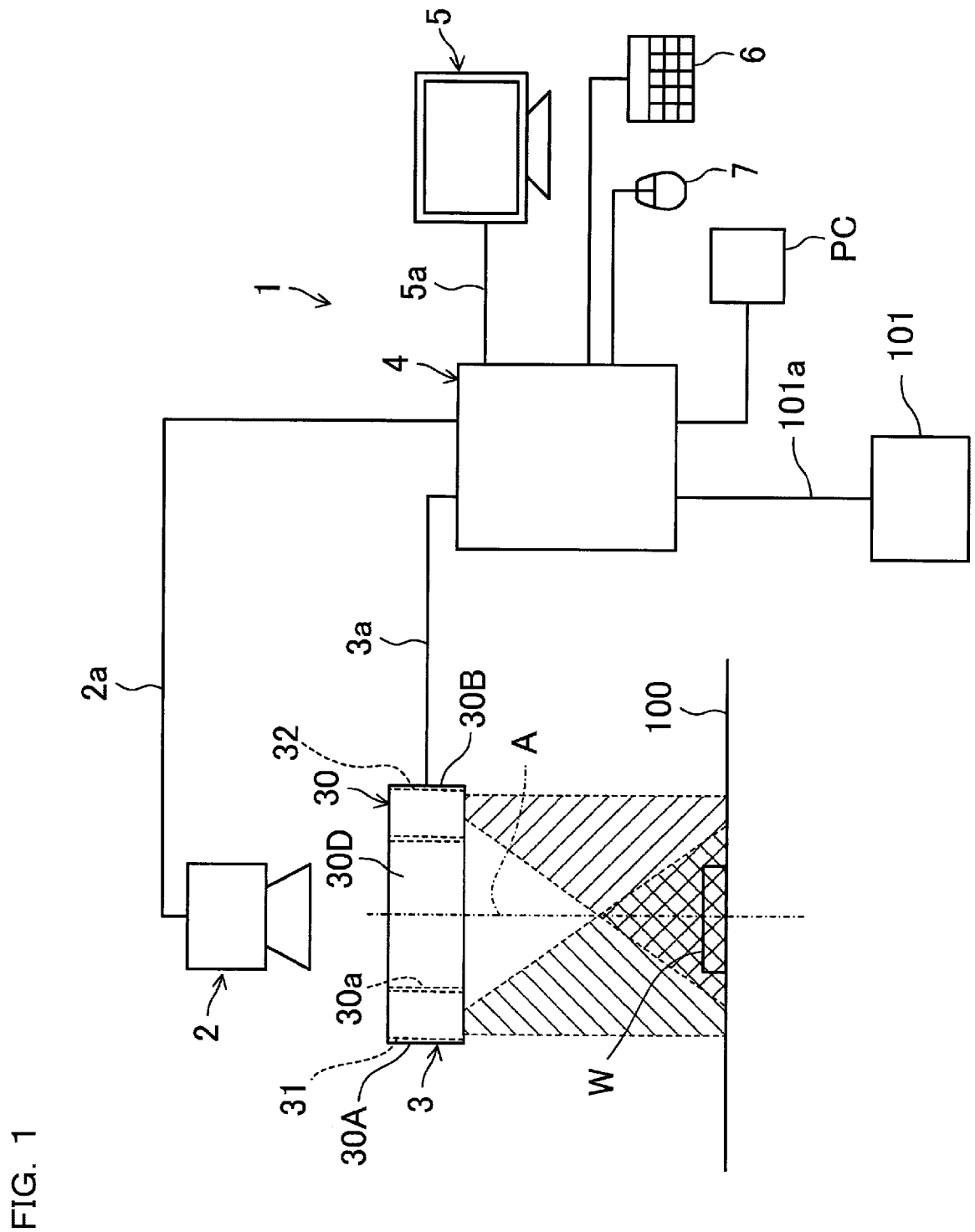
FIG. 1 is a diagram showing a system configuration example of an image processing apparatus according to an embodiment of the present invention.

FIG. 1 is a diagram showing a system configuration example of an image processing apparatus 1 according to an embodiment of the present invention. The image processing apparatus 1 includes an imaging device 2, a lighting device 3, a controller 4, a display 5, a console unit 6, and a mouse 7, and is configured to obtain a height image of the measurement object W so as to be able to measure the height of the measurement object W based on this height image and perform various kinds of inspection on the measurement object W.

While the measurement object W is placed on a placement surface 100 of a carrier device such as a belt conveyor, measurement, various types of inspection, or the like is performed on the height of the measurement object W placed on the placement surface 100. Although the measurement object W is preferably kept still during measurement of the height, for example, in a case where the number of imaging by the imaging device 2 is small or some other case, the height measurement, the inspection, or the like may be performed while the measurement object W is moved in carrying direction of the measurement object W. The measurement object W may be linearly moving or rotating.

The image processing apparatus 1 can be wired to a programmable logic controller (PLC) 101 via a signal line 101a, but the present invention is not limited to this, and a conventionally known communication module may be built in the image processing apparatus 1 and the PLC 101, and the image processing apparatus 1 and the PLC 101 may be connected wirelessly. The PLC 101 is a control device for sequentially controlling the carrier device and the image processing apparatus 1, and a general-purpose PLC can be used. The image processing apparatus 1 can also be used without being connected to the PLC 101.

The display 5 is a display device made up of a liquid crystal display panel and the like, for example, and constitutes a display part. On the display 5, for example, it is possible to display an operation user interface for operating the image processing apparatus 1, a setting user interface for setting the image processing apparatus 1, a height measurement result displaying user interface for displaying a height measurement result of the measurement object, a measurement result displaying user interface for displaying various inspection results of the measurement object, and the like. By viewing the display 5, the user of the image processing apparatus 1 can operate and set the image processing apparatus 1, can grasp the measurement result, the inspection result, and the like of the measurement object W, and can further grasp the operation state of the image processing apparatus 1.

Figure 2:
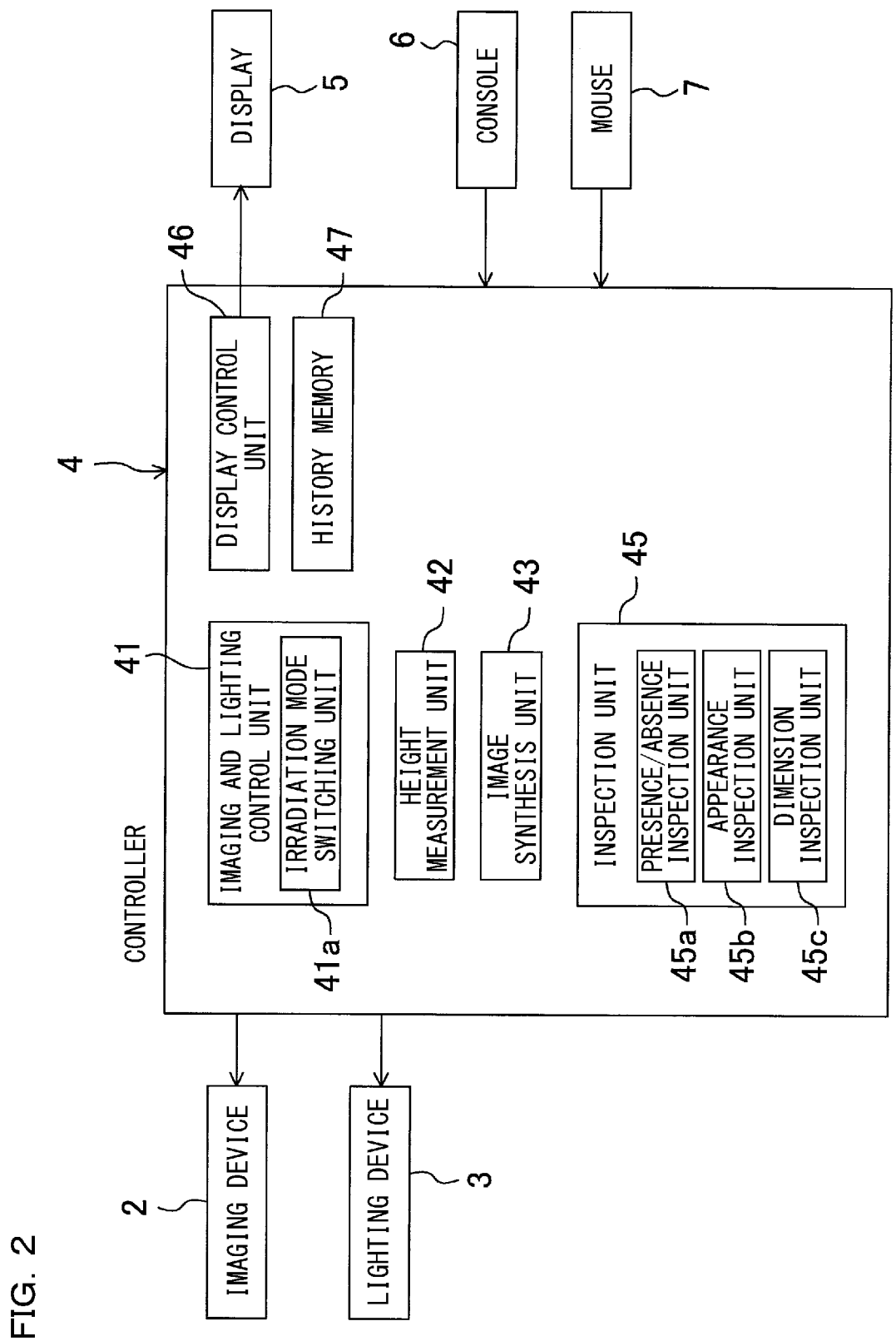
FIG. 2 is a block diagram of a controller.

As shown in FIG. 2, the display 5 is connected to a display control unit 46 in the controller 4 and is configured to be able to display the user interface, the height image, and the like described above under control of the display control unit 46.

The console unit 6 is an input part for the user to operate the image processing apparatus 1 and to input various pieces of information, and is connected to the controller 4. Similarly, the mouse 7 is an input part for the user to operate the image processing apparatus 1 and to input various pieces of information, and is connected to the controller 4. The console unit 6 and the mouse 7 are examples of the input part, and the input part may, for example, be a touch panel screen or the like provided on the display 5 or a voice input device, or may be configured by combining a plurality of these. In the case of the touch panel screen, the display part and the input part can be realized by one device.

A general-purpose personal computer PC for generating and storing a control program of the controller 4 can also be connected to the controller 4. Further, in the personal computer PC, image processing programs for performing various settings relating to image processing can be installed so as to make various settings of image processing to be performed in the controller 4. Alternatively, with software operated on the personal computer PC, a processing order program that defines the processing order of image processing can be generated. In the controller 4, each image processing is sequentially executed in accordance with the processing order. The personal computer PC and the controller 4 are connected via a communication network, and the processing order program generated on the personal computer PC is stored in the controller 4 together with layout information and the like that defines the display manner of the display 5. Conversely, from the controller 4, the processing order program, the layout information, and the like can be taken into the personal computer PC and edited thereon. Note that the above program may be made generable not only in the personal computer PC but also in the controller 4.

Further, the controller 4 can be constructed with dedicated hardware, but the present invention is not limited to this configuration. For example, a general-purpose personal computer PC or workstation, or the like, into which a dedicated image processing program, inspection processing program, and height measuring program, and the like, have been installed, can be caused to function as the controller. In this case, the imaging device 2, the lighting device 3, the display 5, the console unit 6, and the mouse 7 may be connected to the personal computer PC, the workstation, or the like.

Although the functions of the image processing apparatus 1 will be described later, all the functions of the image processing apparatus 1 may be realized by the controller 4, or may be realized by the general-purpose personal computer PC. In addition, some of the functions of the image processing apparatus 1 may be realized by the controller 4, and the remaining functions may be realized by the general-purpose personal computer PC. The functions of the image processing apparatus 1 can be realized by software or can be realized by combination with hardware.

The interface for connecting the imaging device 2, the lighting device 3, the display 5, the console unit 6, and the mouse 7 to the controller 4 may be a dedicated interface, or an existing communication standard, such as Ethernet (product name), USB, or recommended standard RS-232C, can also be used.

Figure 4:
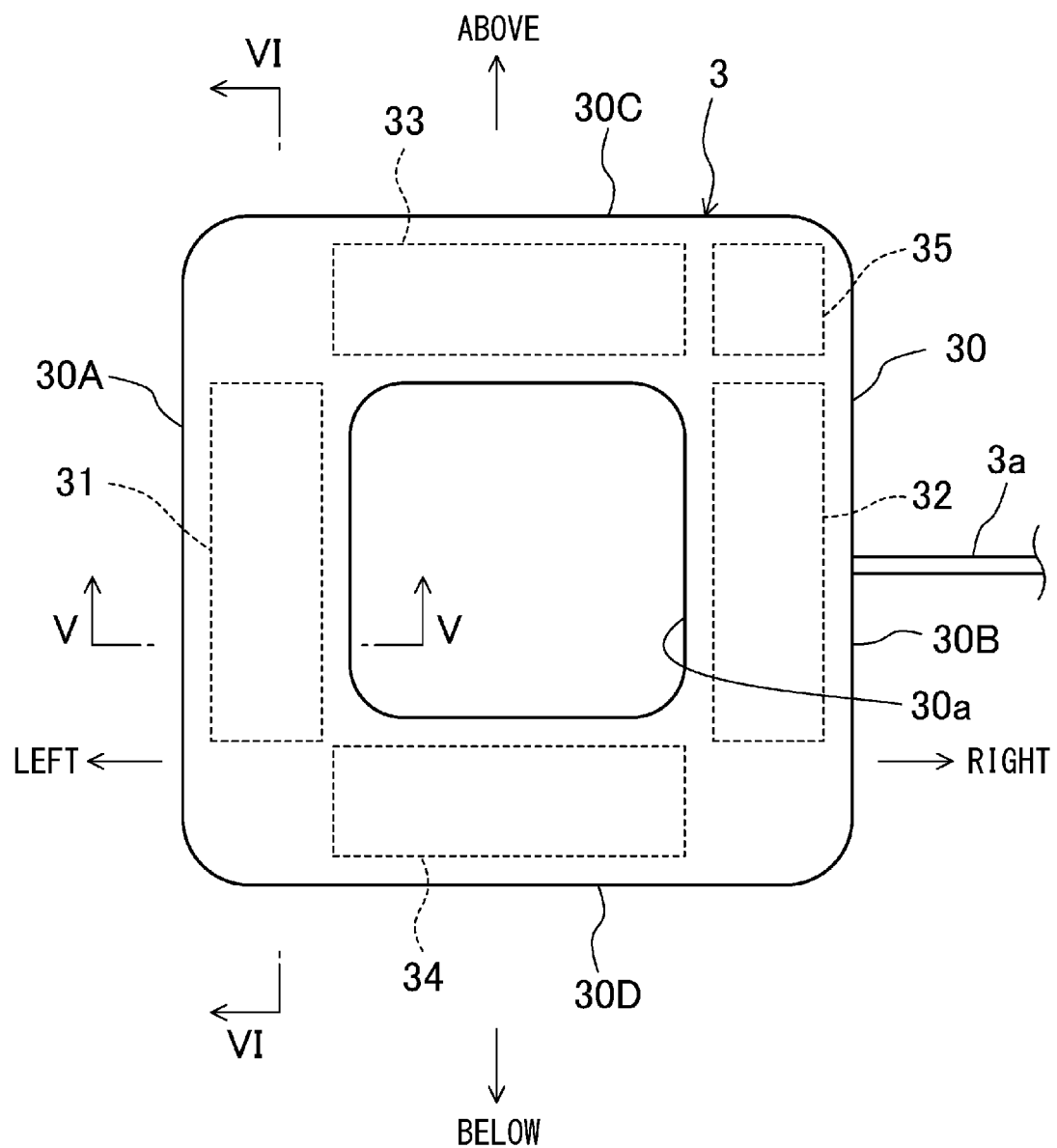
FIG. 4 is a plan view of a lighting device.

The height image representing the height of the measurement object W means an image representing the height of the measurement object W in the direction of a central axis A (shown in FIG. 1) of an opening 30*a* in the lighting device 3 shown in FIG. 4 (Z axis direction in FIG. 15), and may also be regarded as a distance image. The height image can be displayed as a height with respect to the placement surface 100 of the measurement object W as a reference, or can be displayed as a relative distance to the lighting device 3 in the direction of the central axis A, and an image in which a gray value of each pixel changes in accordance with the height. In other words, the height image can also be regarded as an image in which the gray value is determined based on the height of the measurement object W with respect to the placement surface 100 as a reference, or can also be regarded as an image in which the gray value is determined based on the relative distance to the lighting device 3 in the direction of the central axis A. The height image can also be regarded as a multivalued image having a gray value corresponding to the height with respect to the placement surface 100 of the measurement object W as a reference, or can also be regarded as a multivalued image having a gray value corresponding to the relative distance to the lighting device 3 in the direction of the central axis A Moreover, the height image can also be regarded as a multivalued image obtained by converting the height with reference to the placement surface 100 of the measurement object W as a reference to a gray value for each pixel in the luminance image, or can also be regarded as a multivalued image having a gray value corresponding to the relative distance to the lighting device 3 in the direction of the central axis A for each pixel in the luminance image.

The height image may also be an image including the height information of the measurement object W, and for example, a three-dimensional synthesis image obtained by synthesizing and pasting an optical luminance image as texture information to the distance image can also be taken as the height image. The height image is not limited to a three-dimensionally displayed image but includes a two-dimensionally displayed image.

As a method for obtaining a height image as described above, there are roughly divided into two methods: one is a passive method (passive measurement method) of generating a distance image by using an image captured in lighting conditions for obtaining a normal image; and the other is an active method (active measurement method) of actively irradiating the measurement object W with light for measurement in the height direction to generate a distance image. In the present embodiment, the height image is obtained by the active method, and specifically, a pattern projection method is used.

The pattern projection method is a method in which, a shape, phase, or the like of a pattern of a measuring pattern light (also simply referred to as a pattern light) to be projected onto the measurement object W is shifted to acquire a plurality of images, and the plurality of acquired images are analyzed to obtain a three-dimensional shape of the measurement object W. There are several types of pattern projection methods including, for example: a phase shift method in which a phase of a sinusoidal fringe pattern is shifted to acquire a plurality of (at least three) images, a sinusoidal phase is obtained for each pixel from the plurality of images, and by using the obtained phase, three-dimensional coordinates of the surface of the measurement object W is obtained; and a space code method in which a pattern itself to be projected onto the measurement object W is made different for each imaging, for example, a striped pattern with its stripe width getting smaller to a half, one-quarter, one-eighth, one-sixteenth, . . . of a total width at a black-white duty ratio of 50% is sequentially projected, and a pattern projection image is acquired with each pattern, to obtain an absolute phase of the height of the measurement object W. Note that "projecting" the measuring pattern light onto the measurement object W and "irradiating" the measurement object W with the measuring pattern light are synonymous.

In the image processing apparatus 1 according to the present embodiment, the height image is generated by combining the above-described phase shift method and the space code method, but the present invention is not limited thereto, and the height image may be generated only by the phase shift method, or the height image may be generated only by the space code method. In addition, the height image of the measurement object W may be generated using another conventional known active method.

The outline of the measuring method of the height of the measurement object W by the image processing apparatus 1 is as follows. First, the measurement object W is irradiated with the first measuring pattern light and the second measuring pattern light respectively generated by a first light projection unit 31 and a second light projection unit 32 of the lighting device 3 from different directions, the imaging device 2 receives the first measuring pattern light reflected from the measurement object W to generate a first pattern image set composed of a plurality of first pattern images, and the imaging device 2 receives the second measuring pattern light reflected from the measurement object W to generate a second pattern image set composed of a plurality of second pattern images. Thereafter, a first angle image is generated in which each pixel has irradiation angle information of the first measuring pattern light on the measurement object W based on a plurality of first pattern image sets, and a second angle image is generated in which each pixel has irradiation angle information of the second measuring pattern light on the measurement object based on a plurality of second pattern images. Next, a height image representing the height of the measurement object W is generated in accordance with irradiation angle information of each pixel in the first angle image and irradiation angle information of each pixel in the second angle image, and relative position information of the first light projection unit 31 and the second light projection unit 32, and from this height image, the height of the measurement object W is obtained.

Although not indispensable, in the image processing apparatus 1, the lighting device 3 includes a third light projection unit 33 and a fourth light projection unit 34 in addition to the first light projection unit 31 and the second light projection unit 32. Therefore, it is also possible to irradiate the measurement object W with the third measuring pattern light and the fourth measuring pattern light, respectively generated by the third light projection unit 33 and the fourth light projection unit 34 of the lighting device 3, from different directions. In this case, the imaging device 2 receives the third measuring pattern light reflected from the measurement object W to generate a third pattern image set composed of a plurality of third pattern images, and the imaging device 2 receives the fourth measuring pattern light reflected from the measurement object W to generate a fourth pattern image set composed of a plurality of fourth pattern images. Thereafter, a third angle image is generated in which each pixel has irradiation angle information of the third measuring pattern light on the measurement object W based on a plurality of third pattern image, and a fourth angle image is generated in which each pixel has irradiation angle information of the fourth measuring pattern light on the measurement object based on a plurality of fourth pattern image. Next, a height image representing the height of the measurement object W is generated in accordance with irradiation angle information of each pixel in the third angle image and irradiation angle information of each pixel in the fourth angle image, and relative position information of the third light projection unit 33 and the fourth light projection unit 34, and from this height image, the height of the measurement object W is obtained.

(Phase Shift Method)

Here, the phase shift method will be described. In the phase shift method, in the case of sequentially projecting a pattern light having a pattern in which the illuminance distribution is varied in a sinusoidal form onto the measurement object, pattern lights of three or more patterns having different sinusoidal phases are projected. Each lightness value at a height measurement point is obtained from an image taken for each pattern from an angle different from the projection direction of the pattern light, and a phase value of the pattern light is calculated from each lightness value. In accordance with the height of the measurement point, the phase of the pattern light projected onto the measurement point changes, and light of a phase different from the phase observed by the pattern light reflected at the reference position is observed become. Therefore, the phase of the pattern light at the measurement point is calculated, and the phase of the pattern light is substituted into a geometric relational expression by using the principle of triangulation to calculate the height of the measurement point, whereby the three-dimensional shape of the measurement object W can be obtained. According to the phase shift method, the height of the measurement object W can be measured with high resolution by reducing the cycle of the pattern light, but only an object having a low height with a measurable height range being within $2\pi$ in phase shift amount (an object with a small height difference) can be measured. Hence the space code method is also used.

(Space Code Method)

According to the space code method, a space irradiated with light can be divided into a large number of small spaces in a substantially fan-shaped cross section, and the small spaces can be numbered with a series of space code numbers. Thus, even when the height of the measurement object W is large, namely, even when the height difference is large, the height can be calculated from the space code numbers as long as being in the space irradiated with light. Therefore, it is also possible to measure the shape of the entire measurement object W with a large height. As described above, according to the space code method, the allowable height range (dynamic range) expands.

(Detailed Configuration of Lighting Device 3)

Figure 5:
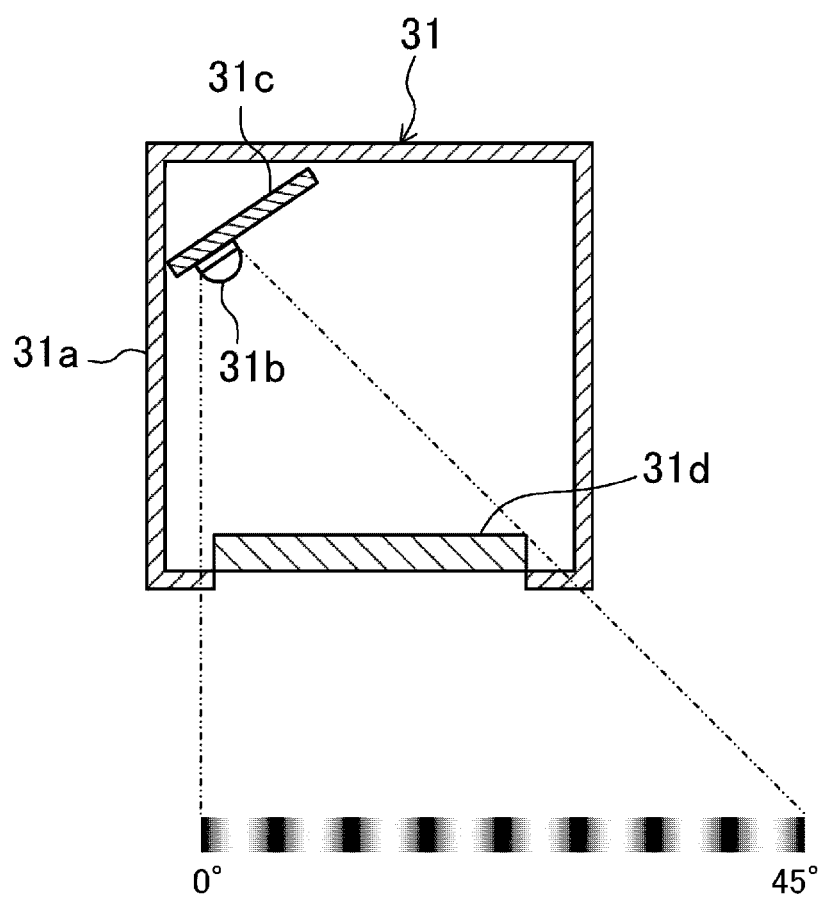
FIG. 5 is a sectional view taken along a line V-V in FIG. 4.

As shown in FIGS. 4 to 6, the lighting device 3 includes a housing 30, the first light projection unit 31, the second light projection unit 32, the third light projection unit 33, the fourth light projection unit 34, and a light projection control unit 35.

As shown in FIG. 1, the lighting device 3 and the controller 4 are connected by a connection line 3a, but the lighting device 3 and the controller 4 may be connected wirelessly.

The lighting device 3 may be a dedicated pattern light projection device only for projecting the pattern light or may be a device that also serves as an observation lighting for observing the measurement object W. When the lighting device 3 is set to be the dedicated pattern light projection device, an observation lighting device can be provided separately from the dedicated pattern light projection device or integrally with the dedicated pattern light projection device. For the observation lighting device, light emitting diodes, semiconductor lasers, halogen lights, HID and the like can be used.

The housing 30 has an opening 30a at the center in a plan view, and a first side portion 30A, a second side portion 30B, a third side portion 30C, and a fourth side portion 30D continuously form a shape close to a rectangle in the plan view. Since the first side portion 30A, the second side portion 30B, the third side portion 30C, and the fourth side portion 30D extend linearly, the opening 30a also has a shape close to a rectangle in the plan view.

Note that the outer shape of the housing 30 and the shape of the opening 30a are not limited to the illustrated shapes, and may be circular or the like, for example. The central axis A of the opening 30a shown in FIG. 1 is an axis passing through the center of the opening 30a and extending in a direction orthogonal to the lower surface of the housing 30. When the lighting device 3 is installed such that the lower surface of the housing 30 is horizontal, the central axis A of the opening 30a extends vertically, but the lighting device 3 can be installed so as to come into a state where the lower surface of the housing 30 is inclined, and in this case, the central axis A of the opening 30a is inclined.

The central axis A of the opening 30a does not need to strictly pass through the center of the opening 30a, and can also be the central axis A passing through a point which is about several mm apart from the center of the opening 30a, depending on the size or the like of the measurement object W. That is, an axis passing through the center of the opening 30a and the vicinity thereof can be defined as the central axis A. The extended line of the central axis A intersects the placement surface 100.

In the following description, for convenience, as shown in FIG. 4, the first side portion 30A side is referred to as the left side of the lighting device 3, the second side portion 30B side is referred to as the right side of the lighting device 3, the third side portion 30C side is referred to as the upper side of the lighting device 3, and the fourth side portion 30D side is the lower side of the lighting device 3, but this does not specify the direction of the lighting device 3 when in use, and the lighting device 3 may be in any orientation when in use.

Figure 6A:
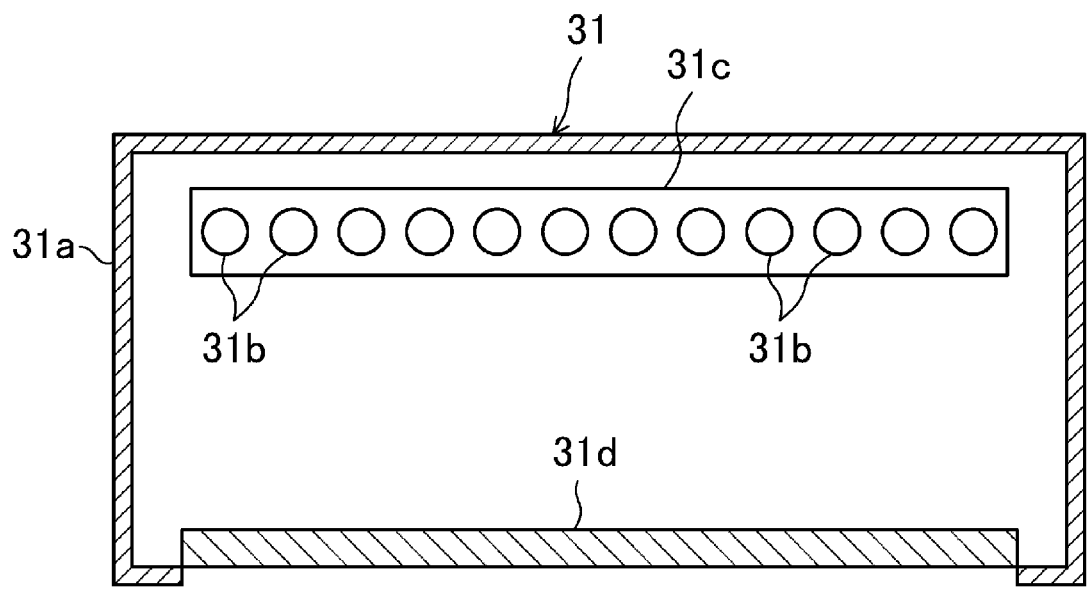
FIG. 6A is a sectional view taken along a line VI-VI in FIG. 4, and shows a case where light emitting diodes are aligned horizontally in a line.
Figure 6B:
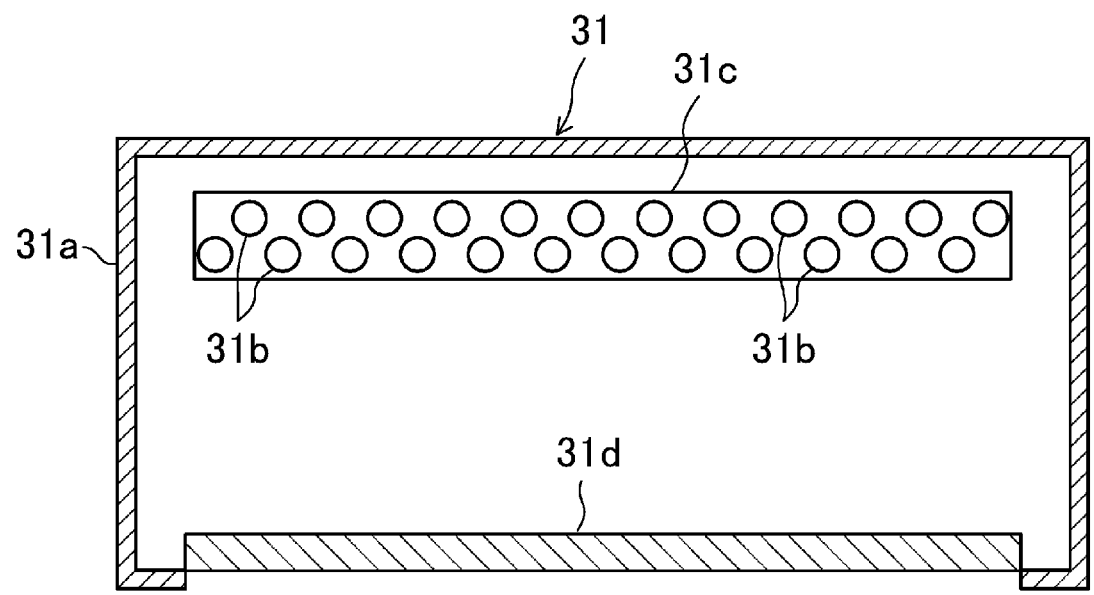
FIG. 6B is a sectional view taken along a line VI-VI in FIG. 4, and shows a case where the light emitting diodes are arranged as vertically shifted.

The insides of the first side portion 30A, the second side portion 30B, the third side portion 30C, and the fourth side portion 30D of the housing 30 are hollow. The first light projection unit 31 shown in FIG. 5 and FIGS. 6A and 6B is accommodated inside the first side portion 30A. The second light projection unit 32, the third light projection unit 33, and the fourth light projection unit 34 are accommodated inside the second side portion 30B, the third side portion 30C, and the fourth side portion 30D, respectively. The first light projection unit 31 and the second light projection unit 32 are paired and the third light projection unit 33 and the fourth light projection unit 34 are paired. The light projection control unit 35 is also accommodated inside the housing 30.

Since the first side portion 30A and the second side portion 30B are arranged so as to face each other with the central axis A interposed therebetween, the first light projection unit 31 and the second light projection unit 32 are arranged so as to be horizontally symmetrical with the central axis A as the center of the symmetry, and are separated from each other in the circumferential direction of the central axis A.

Since the third side portion 30C and the fourth side portion 30D are also arranged so as face each other with the central axis A interposed therebetween, the third light projection unit 33 and the fourth light projection unit 34 are arranged so as to be vertically symmetrical with the central axis A as the center of the symmetry, and are separated from each other in the circumferential direction of the central axis A. In the plan view, four light projection units are arranged in the order of the first light projection unit 31, the third light projection unit 33, the second light projection unit 33, and the fourth light projection unit 34, clockwise around the central axis A.

(Configurations of First Light Projection Unit 31 and Second Light Projection Unit 32)

As shown in FIGS. 5 and 6, the first light projection unit 31 includes: a casing 31a, a first light emitting diode (LED) 31b serving as a light source for emitting diffused light; and a first pattern light generation unit (first LCD) 31d that sequentially generates a plurality of first measuring pattern lights having different patterns by receiving diffused light emitted from the first LED 31b, to irradiate the measurement object W with the generated pattern lights. The LCD is a liquid crystal display, that is, a liquid crystal panel, so the first LCD 31d is a first liquid crystal panel. The first LCD 31d is disposed corresponding to the first LED 31b. As the light emitting diode, for example, a white light emitting diode can be used.

Figure 7:
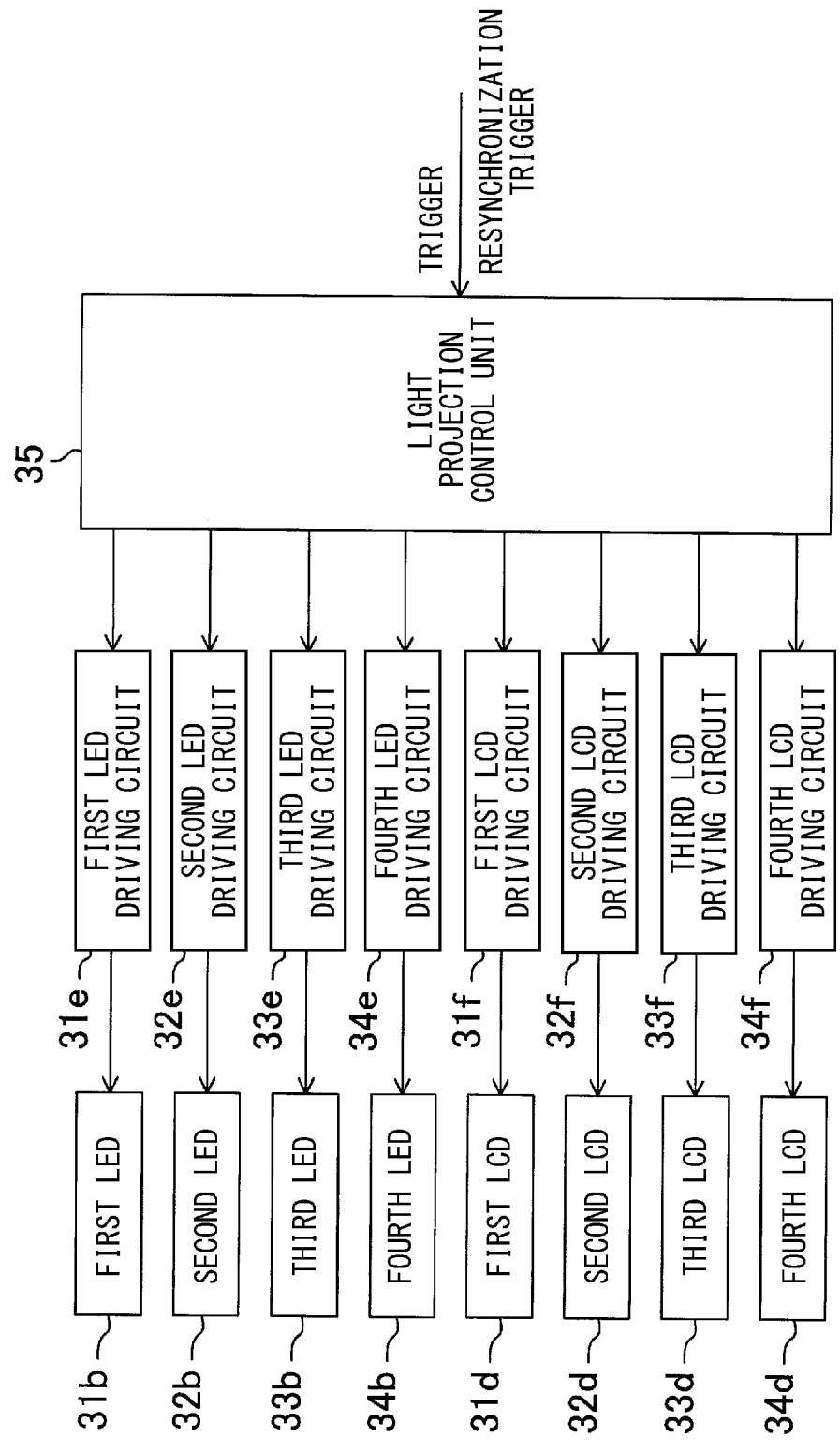
FIG. 7 is a block diagram of the lighting device.

The second light projection unit 32 is configured in the same manner as the first light projection unit 31, and as shown in FIG. 7, the second light projection unit 32 includes a second LED 32b and second pattern light generation unit (second LCD) 32d disposed corresponding to the second LED 32b.

Hereinafter, the configuration of the first light projection unit 31 will be described in detail. As shown in FIG. 6A, a plurality of first LEDs 31b of the first light projection unit 31 are provided, and are arranged so as to be aligned in a direction intersecting the light emitting direction. That is, inside the casing 31a, a substrate 31c extending along the first side portion 30A is disposed in the upper part. As shown in FIG. 5, the substrate 31c is deviated outwardly from the center in the width direction of the first side portion 30A. A plurality of first LEDs 31b are mounted on the surface of the substrate 31c which faces downward, and the plurality of first LEDs 31b are aligned along the first side portion 30A. The plurality of first LEDs 31b may be arranged so as to be aligned linearly as shown in FIG. 6A, or may be arranged such that adjacent first LEDs 31b are shifted vertically as shown in FIG. 6B. The light source is not limited to the light emitting diode, and may be a light emitter that emits diffused light. By aligning the plurality of first LEDs 31b along the first side portion 30A, the light emitted from the first LED 31b becomes almost continuous in the direction of the first side portion 30A.

The plurality of first LEDs 31b can emit light in the same direction, and in the present embodiment, as indicated by left-down oblique lines in FIG. 1, the lights are set to be emitted from immediately under the first LED 31b and reach at least the second side portion 30B side with respect to the central axis A of the opening 30a of the housing 30 (the right side of the lighting device 3). The range of irradiation with light by the plurality of first LEDs 31b is set wider than the imaging field of view by the imaging device 2.

Figure 15:
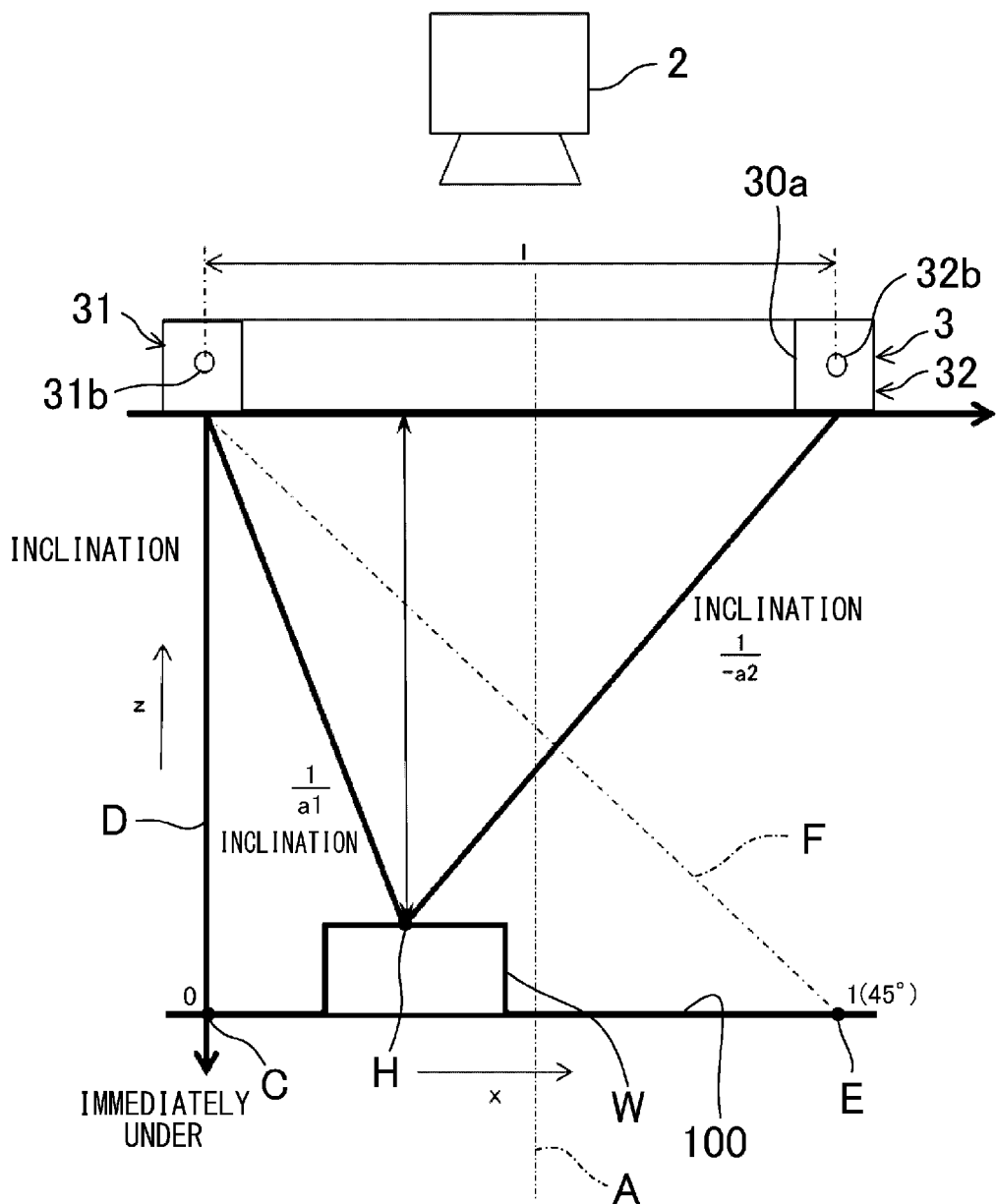
FIG. 15 is a view for explaining a height measuring method by the height measurement unit.

The light emission range of the plurality of first LEDs 31b will be specifically described. As shown in FIG. 15, a direction in which the first light projection unit 31 and the second light projection unit 32 are separated is defined as an X direction, and a vertical direction is set as a Z direction. The lighting device 3 is disposed such that the lower surface of the lighting device 3 is horizontal (parallel to the placement surface 100), and is installed upward from the placement surface 100 of the measurement object W by "1". X=0 is assumed to be immediately under the first LED 31b, and a straight line D extending from the first LED 31b to a point C of (X, Z)=(0, 0) is drawn. Further, a straight line F extending from the first LED 31b to a point E of (X, Z)=(1, 0) is drawn. At this time, the direction of the first LED 31b is set such that the light emission range of the plurality of first LEDs 31b is a region between the straight line D and the straight line F, and a light source lens of the first LED 31b is designed.

As shown in FIG. 7, the first light projection unit 31 is provided with a first LED driving circuit (light source driving circuit) 31e for driving the first LED 31b and a first LCD driving circuit (liquid crystal panel driving circuit) 31f for driving the first LCD 31d. The first LED driving circuit 31e is a circuit for changing a supply current value to the first LED 31b, and is controlled by the light projection control unit 35. Therefore, the first LED 31b is controlled by the light projection control unit 35 via the first LED driving circuit 31e. The current value control by the first LED driving circuit 31e is discretionary access control (DAC) control.

Figure 10:
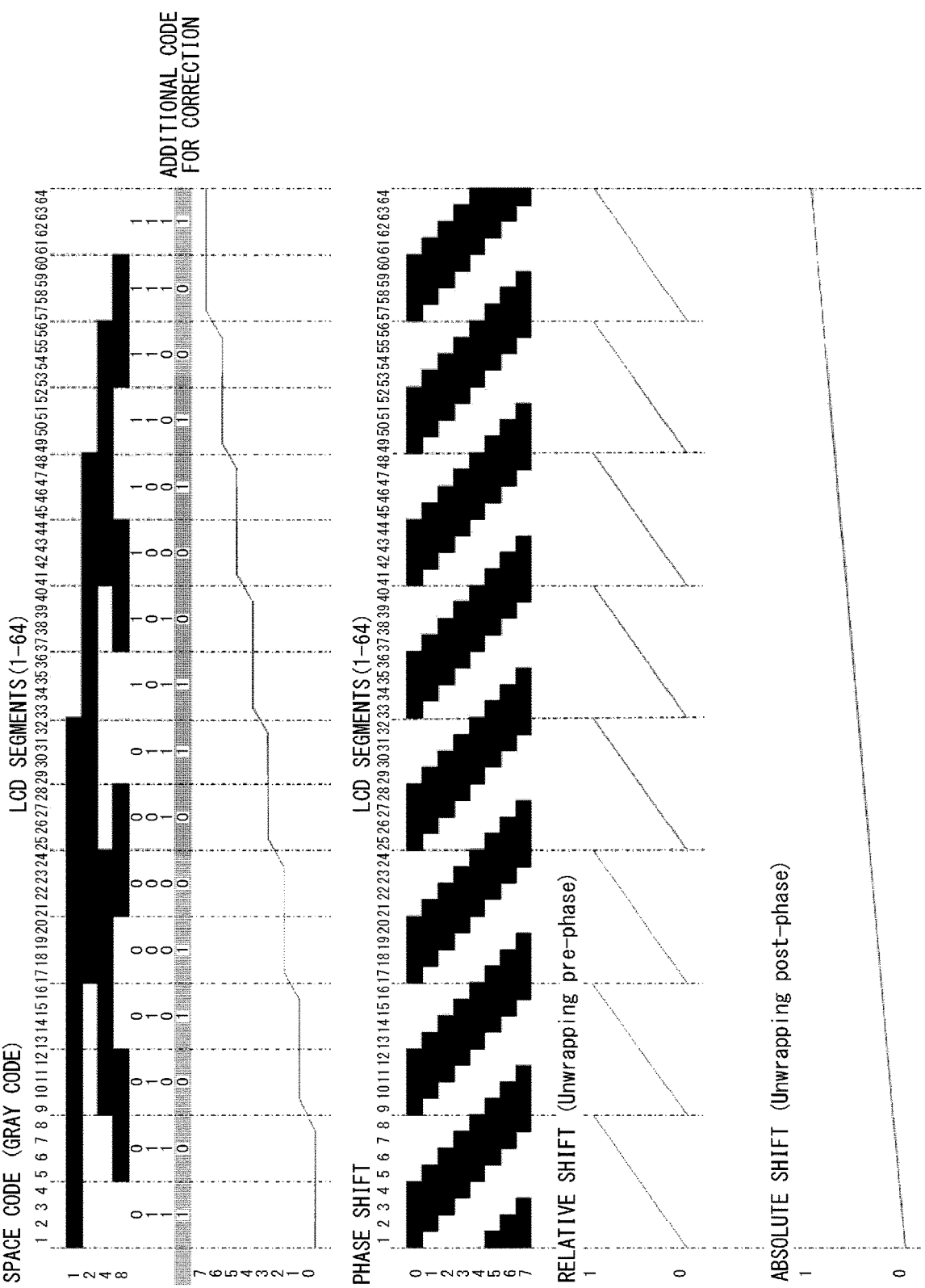
FIG. 10 is a diagram showing processing of forming a Gray code pattern and a phase shift pattern, and a relation between a relative phase and an absolute phase.

The first LCD driving circuit 31f is a circuit for changing a voltage to be applied to each segment constituting the first LCD 31d to change an orientation of a liquid crystal composition of each segment. In the present embodiment, as an example is shown in FIG. 10, the number of segments constituting the first LCD 31d is 64, the voltage to be individually applied to each of the 64 segments can be changed, and for each segment, it is possible to switch between a state in which light emitted from the first LED 31b is allowed to pass and a state in which the light is not allowed to pass. The first LCD driving circuit 31f is controlled by the light projection control unit 35 shared with the first LED driving circuit 31e. Hence the first LCD 31d is controlled by the light projection control unit 35 via the first LCD driving circuit 31f. In addition, since the first LED driving circuit 31e and the first LCD driving circuit 31f are controlled by the common light projection control unit 35, it is possible to precisely synchronize the first LED driving circuit 31e and the first LCD driving circuit 31f.

The first LCD driving circuit 31f controlled by the light projection control unit 35 drives the first LCD 31d, so that the first LCD 31d can sequentially generate a plurality of first measuring pattern lights having different patterns by receiving diffused light emitted from the first LED 31b, to irradiate the measurement object W with the generated lights. The plurality of first measuring pattern lights include a pattern light for a space code (Gray code) used in the space code method and a pattern light having a periodic illuminance distribution used in the phase shift method.

The case of generating the pattern light for the space code by the first LCD 31d is shown on the upper side of FIG. 10, and the case of generating the pattern light having a periodic illuminance distribution used in the phase shift method is shown on the lower side of FIG. 10. In FIG. 10, a blacked-out portion is a segment where the diffused light emitted from the first LED 31b is not allowed to pass, and a white portion is a segment where the diffused light emitted from the first LED 31b is allowed to pass. In addition, in FIG. 10, 64 segments constituting the first LCD 31d are arranged so as to be aligned laterally in FIG. 10.

The case of generating the pattern light for the space code on the upper side of FIG. 10 shows the case of generating a stripe pattern with its stripe width getting smaller to a half, one-quarter, . . . of a total width at a black-white duty ratio of 50%. By controlling the first LCD 31d in this manner, the pattern light for the space code can be generated sequentially.

In the case of generating the pattern light for the phase shift method on the lower side of FIG. 10, a plurality of sinusoidal stripe patterns are generated shifting the phases thereof. In the case of this example, a rectangular wave pattern is generated by binary control on the LCD display, but the rectangular wave pattern generated on this LCD blurs on the light irradiation surface, so that a sinusoidal pattern can be obtained. In this example, eight pattern lights are generated. By controlling the first LCD 31d in this manner, the pattern light for the phase shift method can be generated sequentially.

That is, the light projection control unit 35 controls the first LED 31b and the first LCD 31d so as to sequentially generate a plurality of pattern lights according to the phase shift method and/or the space code method. When projection of one pattern light out of the plurality of pattern lights is completed, the next pattern light is projected, and by repeating this processing, all the pattern lights are projected. The pattern formation processing by the first LCD 31d will be described later.

Note that the number of the pattern lights for the space code and the number of the pattern lights for the phase shift method are not limited to the illustrated numbers.

The light emission range of the light of the second LED 32b of the second light projection unit 32 is set to a range from immediately under the second LED 32b to at least the first side portion 30A side with respect to the central axis A of the opening 30a of the housing 30 (the left side of the lighting device 3). That is, the light emission range of the second LED 32b of the second light projection unit 32 is set so as to be horizontally symmetrical to that of the first LED 31b of the first light projection unit 31 with the central axis A of the opening 30a of the housing 30 taken as the center of the symmetry. The light emission range of the second LED 32b is indicated by right-down oblique lines in FIG. 1.

As shown in FIG. 7, a second LED driving circuit (light source driving circuit) 32e for driving the second LED 32b and a second LCD driving circuit (liquid crystal panel driving circuit) 32f for driving the second LCD 32d are provided in the second light projection unit 32, and these are controlled by the light projection control unit 35. Since the second LCD 32d is driven in the same manner as the first LCD 31d, the second LCD 32d can sequentially generate a plurality of second measuring pattern lights having different patterns by receiving diffused light emitted from the second LED 32b, to irradiate the measurement object W with the generated lights. The plurality of second measuring pattern lights include the pattern light for the space code and the pattern light for the phase shift method.

The first light projection unit 31 and the second light projection unit 32 are integrally supported by the housing 30 in the state of being separated from each other in the circumferential direction of the central axis A of the opening 30a of the housing 30 such that the pattern light emitted from the first light projection unit 31 and the pattern light emitted from the second light projection unit 32 have substantially the same spread angles to intersect each other on the central axis A. "Integrally supported" means that the first light projection unit 31 and the second light projection unit 32 are fixed to the housing 30 so that the relative positional relation between the first light projection unit 31 and the second light projection unit 32 do not change during installation or use. Therefore, since the relative positions of the first light projection unit 31 and the second light projection unit 32 in the housing 30 do not change, for example as shown in FIG. 15, when the distance between the central portion of the first LED 31b and the central portion of the second LED 32b is set to 1, the distance between the central portion of the first LED 31b and the central portion of the second LED 32b is fixed at 1 also during installation or use. The distance between the central portion of the first LED 31b and the central portion of the second LED 32b is the relative position information of the first light projection unit 31 and the second light projection unit 32 in the housing 30 and can be stored in advance into the controller 4 and the imaging device 2.

The relative position information of the first light projection unit 31 and the second light projection unit 32 in the housing 30 may be a linear distance between the central portion of the first LED 31b and the central portion of the second LED 32b, and in a case where the light emitted from each LED is reflected by a mirror or the like and the measurement object W is reflected by the reflected light, the distance can be set in consideration of the path length of the light.

Since the first LCD 31d is disposed on the left side of the lighting device 3, the pattern light is projected from the left side of the measurement object W placed on the placement surface 100. Since the second LCD 32d is disposed on the right side of the lighting device 3, the pattern light is projected from the right side of the measurement object W placed on the placement surface 100. The first LCD 31d and the second LCD 32d are liquid crystal panels that project pattern lights from different directions onto the measurement object W.

(Configuration of Third Light Projection Unit 33 and Fourth Light Projection Unit 34)

The third light projection unit 33 and the fourth light projection unit 34 are configured similarly to the first light projection unit 31, and as shown in FIG. 7, the third light projection unit 33 includes a third LED 33b and a third pattern light generation unit (third LCD) 33d disposed corresponding to the third LED 33b, and the fourth light projection unit 34 includes a fourth LED 34b and a fourth pattern light generation unit (fourth LCD) 34d disposed corresponding to the fourth LED 34b.

The light emission range of the third LED 33b of the third light projection unit 33 and the light emission range of the fourth LED 34b of the fourth light projection unit 34 are the same as the light emission range of the first LED 31b of the first light projection unit 31 and the light emission range of the second LED 32b of the second light projection unit 32. Specifically, the light emission range of the third LED 33b of the third light projection unit 33 is set such to a range from immediately under the third LED 33b to at least the fourth side portion 30D side with respect to the central axis A of the opening 30a of the housing 30. The light emission range of the fourth LED 34b of the fourth light projection unit 34 is set to a range from immediately under the fourth LED 34b to at least the third side portion 30C side with respect to the central axis A of the opening 30a of the housing 30. Therefore, the light emission range of third LED 33b of the third light projection unit 33 and the fourth LED 34b of the fourth light projection unit 34 are set so as to be vertically symmetrical when the central axis A of the opening 30a of the housing 30 is taken as the center of the symmetry.

As shown in FIG. 7, a third LED driving circuit (light source driving circuit) 33e for driving the third LED 33b, a third LCD driving circuit (liquid crystal panel driving circuit) 33f for driving the third LCD 33d are provided in the third light projection unit 33, and these are controlled by the light projection control unit 35. Since the third LCD 33d is driven in the same manner as the first LCD 31d, the third LCD 33d can sequentially generate a plurality of third measuring pattern lights having different patterns by receiving diffused light emitted from the third LED 33b, to irradiate the measurement object W with the generated lights. The plurality of third measuring pattern lights include the pattern light for the space code and the pattern light for the phase shift method.

A fourth LED driving circuit (light source driving circuit) 34e for driving the fourth LED 34b and a fourth LCD driving circuit (liquid crystal panel driving circuit) 34f for driving the fourth LCD 34d are provided in the fourth light projection unit 34, and these are controlled by the light projection control unit 35. Since the fourth LCD 34d is driven in the same manner as the first LCD 31d, the fourth LCD 34d can sequentially generate a plurality of fourth measuring pattern lights having different patterns by receiving the diffused light emitted from the fourth LED 34b, to irradiate the measurement object W with the generated lights. The plurality of fourth measuring pattern lights include the pattern light for the space code and the pattern light for the phase shift method.

The third light projection unit 33 and the fourth light projection unit 34 are supported integrally with the housing 30 in the state of being separated from each other in the circumferential direction of the central axis A of the opening 30a of the housing 30 such that the pattern light emitted from the third light projection unit 33 and the pattern light emitted from the fourth light projection unit 34 have substantially the same spread angles to intersect each other on the central axis A. Therefore, since the relative positions of the third light projection unit 33 and the fourth light projection unit 34 in the housing 30 do not change, when the distance between the central part of the third LED 33b and the central part of the fourth LED 34b is previously set to a predetermined value, the distance between the central portion of the third LED 33b and the central portion of the fourth LED 34b is fixed to the predetermined value even during installation or use. The distance between the central portion of the third LED 33b and the central portion of the fourth LED 34b is the relative position information of the third light projection unit 33 and the fourth light projection unit 34 in the housing 30, and can be stored in advance into the controller 4 and the imaging device 2.

Since the third LCD 33d is arranged on the upper side of the lighting device 3, the pattern light is projected from the direction with respect to the measurement object W placed on the placement surface 100. Since the fourth LCD 34d is disposed on the lower side of the lighting device 3, the pattern light is projected from the direction with respect to the measurement object W placed on the placement surface 100. The third LCD 33d and the fourth LCD 34d are liquid crystal panels that project pattern lights from different directions onto the measurement object W.

(Control by Light Projection Control Unit 35)

As shown in FIG. 7, in the present embodiment, the first LED driving circuit 31e, the second LED driving circuit 32e, the third LED driving circuit 33e, the fourth LED driving circuit 34e, the first LCD driving circuit 31f, the second LCD driving circuit 32f, the third LCD driving circuit 33f, and the fourth LCD driving circuit 34f are controlled by the common light projection control unit 35. It is thus possible to precisely synchronize these driving circuits.

The light projection control unit 35 controls the first LCD 31d, the second LCD 32d, the third LCD 33d, and the fourth LCD 34d so as to repeat the following processing: by the time of completion of projection of one pattern light among a plurality of pattern lights from any one of the first LCD 31d, the second LCD 32d, the third LCD 33d, and the fourth LCD 34d, formation processing of a pattern to be projected next is completed on at least another liquid crystal panel on which the pattern light is to be projected next, and after the projection of the pattern light by the one liquid crystal panel is completed, the next pattern light is projected on another liquid panel described above.

Figure 14:
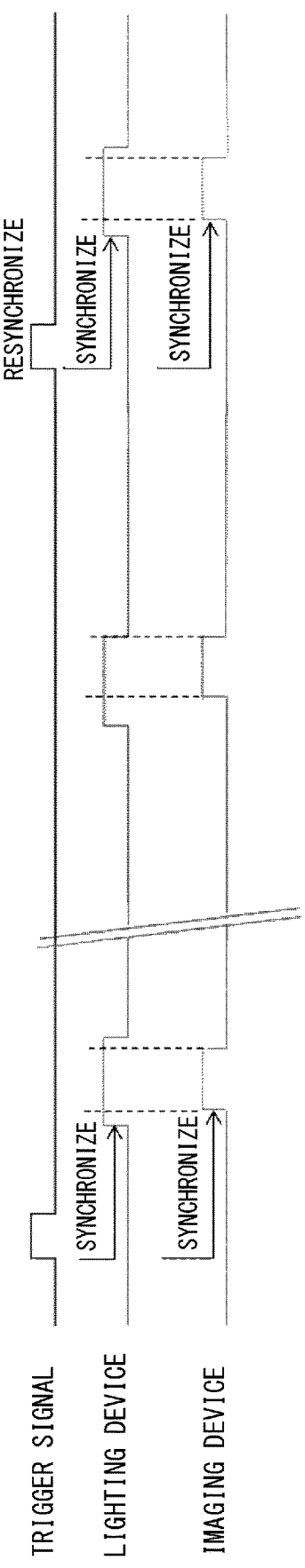
FIG. 14 is a time chart in the case of resynchronizing the lighting device and the imaging device.

Specifically, as shown in FIG. 14, a trigger signal for starting projection of the pattern light and a resynchronization trigger signal for establishing synchronization with the imaging device 2 during projection of the pattern light are input from the controller 4 into the light projection control unit 35 of the lighting device 3. The trigger signal may be input from the PLC 101. For example, based on a detection result by a photoelectric sensor or the like connected to the PLC 101, the trigger signal can be input into the light projection control unit 35.

The device that generates the trigger signal may not be the PLC 101, but may be a photoelectric sensor or the like. In this case, the photoelectric sensor or the like can be connected directly to the light projection control unit 35 or can be connected via the controller 4.

Figure 11:
FIG. 11 is a time chart showing operations of the lighting device and the imaging device.

As shown in FIG. 11, when the trigger signal is input, the light projection control unit 35 controls the first LCD 31d via the first LCD driving circuit 31f so as to switch the pattern being currently formed on the first LCD 31d to a pattern A1 different from the current display form. Here, for switching the pattern on the first LCD 31d, the first LED driving circuit 31e varies an applied voltage to a liquid crystal composition of each segment constituting the first LCD 31d by a known method. The time from the change of the applied voltage to the liquid crystal composition until the liquid crystal composition changes its orientation is longer than an imaging interval by the imaging device 2 described later. That is, in order to switch the pattern being currently formed on the first LCD 31d to a different pattern, a predetermined pattern switching time longer than the imaging interval by the imaging device 2 is required, and the time to switch from the pattern A1 to the pattern A2 and the time to switch from the pattern A2 to the pattern A3 are required. In portions showing the operations of the first to fourth LCDs in FIG. 11, a portion painted with light black is the time for formation of the pattern that is to be projected next, namely, the pattern switching time, and a white portion shows the time when the pattern formation is complete.

The second LCD 32d similarly needs the time to sequentially switch to a pattern B1, a pattern B2, and a pattern B3, the third LCD 33d similarly needs the time to sequentially switch to a pattern C1, a pattern C2, and a pattern C3, and the fourth LCD 34d similarly needs the time to sequentially switch to a pattern D1, a pattern D2, and a pattern D3.

Control is performed such that, while the pattern A1 is completely formed on the first LCD 31d, light is emitted from the first LED 31b in synchronization with the formation of the pattern A1, light is not emitted from the second LED 32b, the third LED 33b, or the fourth LED 34b. As a result, only the pattern A1 being formed on the first LCD 31d is projected onto the measurement object W as the pattern light, so that the patterns formed on the second LCD 32d, the third LCD 33d, and the fourth LCD 34d are not projected onto the measurement object W.

The time during which the pattern A1 is being formed on the first LCD 31d is a part of the pattern switching time for forming the pattern B1 on the second LCD 32d. The time for forming the pattern B1 on the second LCD 32d is longer than the time during which the pattern A1 is being formed on the first LCD 31*d*. Specifically, the time for forming the pattern B1 on the second LCD 32*d* is longer than the time for forming the pattern A1 on the first LCD 31*d* It started from before.

When the imaging of the pattern light of the pattern A1 projected onto the measurement object W is completed, while the pattern B1 is being completely formed on the second LCD 32*d*, control is performed such that light is emitted from the second LED 32*b* in synchronization with the formation of the pattern B1 and light is not emitted from the first LED 31*b*, the third LED 33*b*, or the fourth LED 34*b*. As a result, only the pattern B1 formed on the second LCD 32*d* is projected onto the measurement object W as the pattern light.

The time during which this pattern B1 is being formed on is a part of the switching time for forming the pattern C1 on the third LCD 33*d*. The time for forming the pattern C1 on the third LCD 33*d* is longer than the time during which the pattern B1 is being formed on the second LCD 32*d*, and more specifically, the time for forming the pattern C1 on the third LCD 33*d* is longer than the time for forming the pattern A1 on the first LCD 31*d* It started from before.

When the imaging of the pattern light of the pattern B1 projected onto the measurement object W is completed, while the pattern C1 is completely formed on the third LCD 33*d*, control is being completely performed such that light is emitted from the third LED 33*b* in synchronization with the formation of the pattern C1 and light is not emitted from the first LED 31*b*, the second LED 32*b*, or the fourth LED 34*b*. As a result, only the pattern C1 formed on the third LCD 33*d* is projected onto the measurement object W as the pattern light.

The time during which this pattern C1 is being formed on is a part of the switching time for forming the pattern D1 on the fourth LCD 34*d*. The time for forming the pattern D1 on the fourth LCD 34*d* is longer than the time during which the pattern C1 is being formed on the third LCD 33*d*, and specifically, the time for forming the pattern D1 on the fourth LCD 34*d* is started before completion of the formation of the pattern A1 on the first LCD 31*d*.

When the imaging of the pattern light of the pattern C1 projected onto the measurement object W is completed, while the pattern D1 is being completely formed on the fourth LCD 34*d*, control is being completely performed such that light is emitted from the fourth LED 34*b* in synchronization with the formation of the pattern D1 and light is not emitted from the first LED 31*b*, the second LED 32*b*, or the third LED 33*b*. As a result, only the pattern D1 formed on the fourth LCD 34*d* is projected onto the measurement object W as the pattern light. A part of the time during which this pattern D1 is being formed is a part of the switching time for forming the next pattern A2 on the first LCD 31*d*.

That is, in the present embodiment, successive projection of a plurality of pattern lights by one liquid crystal panel among the first LCD 31*d*, the second LCD 32*d*, the third LCD 33*d*, and the fourth LCD 34*d* is not continuously performed, but the first LCD 31*d*, the second LCD 32*d*, the third LCD 33*d*, and the fourth LCD 34*d* are controlled as follows: when projection of a first pattern light by one liquid crystal panel is completed, projection of a first pattern light by another liquid crystal panel is performed, and when the projection of the first pattern light by another liquid crystal panel is completed, projection of a first pattern light by still another liquid crystal panel is performed, and when the projection of the first pattern light is completed in all liquid crystal panels in this manner, projection of a second pattern light by the one liquid crystal panel is performed, and when the projection of the second pattern light by the one liquid crystal panel is completed, projection of a second pattern light by another liquid crystal panel described above is performed, and when the projection of the second pattern light by another liquid crystal panel described above is completed, projection of a second pattern light by still another liquid crystal panel described above is performed. Therefore, in the liquid crystal panel not projecting the pattern light, the formation of the pattern to be projected next can be prepared to compensate for a slow response speed of the liquid crystal panel.

Although the case has been described in the above example where the pattern lights are projected by all of the first LCD 31*d*, the second LCD 32*d*, the third LCD 33*d*, and the fourth LCD 34*d*, the invention is not limited to this, and it is also possible to project the pattern lights only with the first LCD 31*d* and the second LCD 32*d*, and to project the pattern lights only with the third LCD 33*d* and the fourth LCD 34*d*. In the case of projecting the pattern lights only with the first LCD 31*d* and the second LCD 32*d*, the pattern lights may only be projected alternately, and for example, the following is repeated: while the first pattern light is being projected by the first LCD 31*d*, first pattern formation processing is performed on the second LCD 32*d*, and thereafter, while the first pattern light is being projected by the second LCD 32*d*, second pattern formation processing is performed on the first LCD 31*d*. The same applies to the case where the pattern lights are projected only by the third LCD 33*d* and the fourth LCD 34*d*.

In addition to the trigger signal and the resynchronization trigger signal, the formation information of the pattern light is also transmitted from the controller 4 to the light projection control unit 35, and the transmitted formation information of the pattern light is temporarily stored into the light projection control unit 35, and based on the formation information of the pattern light, the first LED 31*b*, the second LED 32*b*, the third LED 33*b*, and the fourth LED 34*b* and the first LCD 31*d*, the second LCD 32*d*, the third LCD 33*d*, and the fourth LCD 34*d* are controlled.

The formation information of the pattern light includes, for example, irradiation modes, irradiation or non-irradiation with the pattern light for the space code, the specific pattern and number of the pattern lights for the space code, irradiation or non-irradiation with the pattern light for the phase shift method, the specific pattern and number of the pattern lights for the phase shift method, the irradiation order of the pattern lights, and the like. The irradiation mode includes: a first irradiation mode in which irradiation with pattern lights is performed only by the first LCD 31*d* and the second LCD 32*d* and the pattern lights are projected onto the measurement object W; a second irradiation mode in which irradiation with pattern lights is performed by all of the first LCD 31*d*, the second LCD 32*d*, the third LCD 33*d*, and the fourth LCD 34*d* and the pattern lights are projected onto the measurement object W; and a third irradiation mode in which irradiation with pattern lights is performed only by the third LCD 33*d* and the fourth LCD 34*d* and the pattern lights are projected onto the measurement object W.

(Configuration of Imaging Device 2)

As shown in FIG. 1 and the like, the imaging device 2 is provided separately from the lighting device 3. As shown in FIG. 1, the imaging device 2 and the controller 4 are connected by a connection line 2*a*, but the imaging device 2 and the controller 4 may be wirelessly connected.

The imaging device 2 constitutes a part of the image processing apparatus 1, and can thus be also referred to as an imaging unit. Since the imaging device 2 is provided separately from the lighting device 3, the imaging device 2 and the lighting device 3 can be installed separately. Therefore, it is possible to change the installation place of the imaging device 2 and the installation place of the lighting device 3, and to separate the installation place of the imaging device 2 from the installation place of the lighting device 3. This greatly improves the flexibility at the time of installing the imaging device 2 and the lighting device 3, to enable introduction of the image processing apparatus 1 to every production site and the like.

As long as the site is where the installation location of the imaging device 2 and the installation location of the lighting device 3 can be made the same, the imaging device 2 and the lighting device 3 can also be attached to the same member, and the user can change the installation state in a freely selected manner in accordance with the site. In addition, the imaging device 2 and the lighting device 3 can be attached to the same member and used integrally.

The imaging device 2 is disposed above the housing 30 of the lighting device 3, namely, on the side opposite to the emission direction of the pattern light, so as to look into the opening 30*a* of the housing 30. Therefore, through the opening 30*a* of the housing 30 of the lighting device 3, the imaging device 2 receives the first measuring pattern lights reflected from the measurement object W to generate a plurality of first pattern images, and receives the second measuring pattern lights reflected from the measurement object W to generate a plurality of second pattern images. Further, when the lighting device 3 includes the third light projection unit 33 and the fourth light projection unit 34, through the opening 30*a* of the housing 30 of the lighting device 3, the imaging device 2 receives the third measuring pattern lights reflected from the measurement object W to generate a plurality of third pattern images, and receives the fourth measuring pattern lights reflected from the measurement object W to generate a plurality of fourth pattern images.

Figure 3:
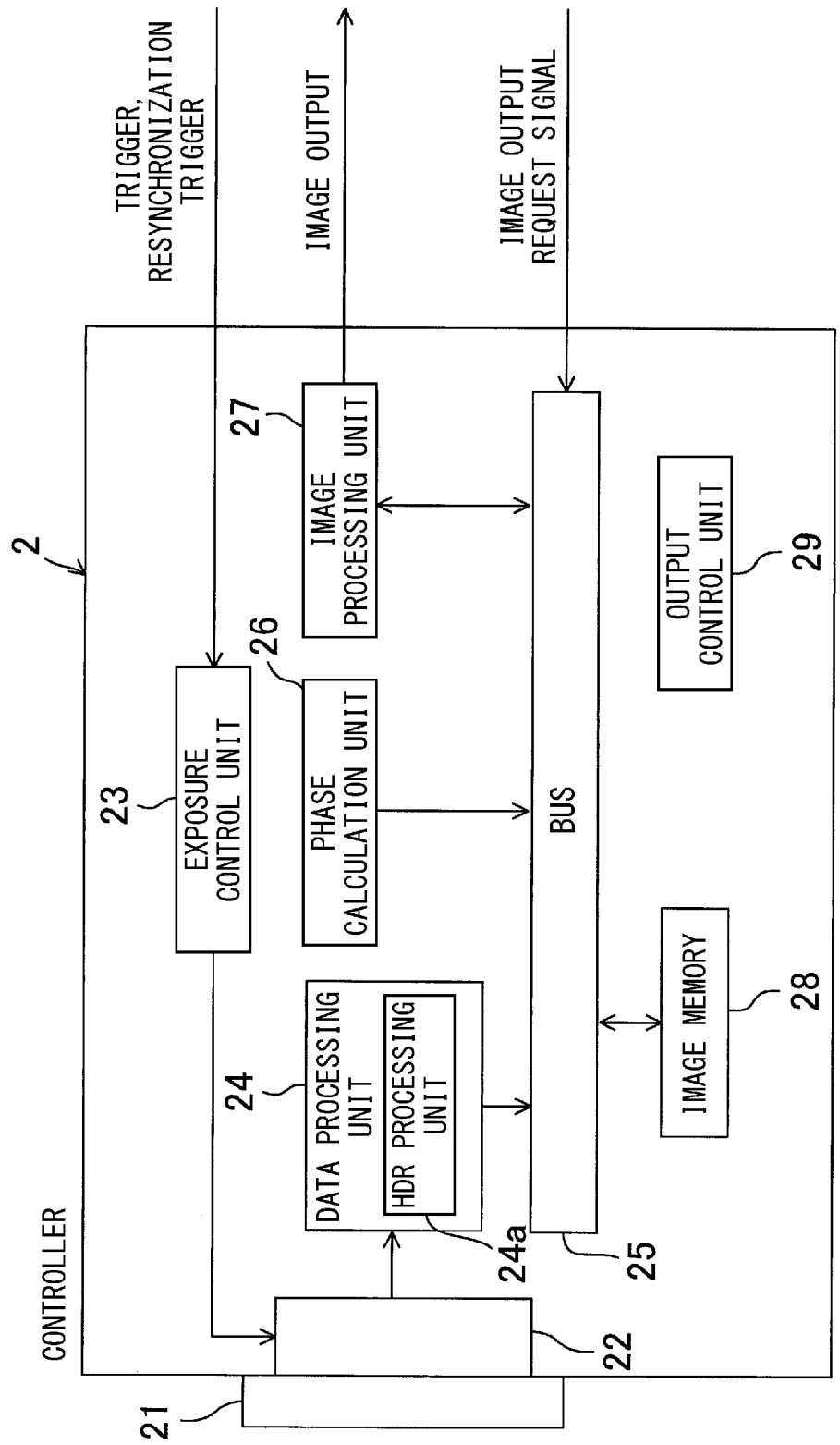
FIG. 3 is a block diagram of an imaging device.

As shown in FIG. 3, the imaging device 2 includes a lens 21 constituting an optical system and an imaging element 22 made up of a light receiving element for receiving light incident from the lens 21, and the lens 21 and the imaging element 22 constitute a so-called camera. The lens 21 is a member for forming on the imaging element 22 an image of at least in a height measurement area or an inspection target area in the measurement object W. It is not necessary to match the optical axis of the lens 21 with the central axis A of the opening 30*a* of the housing 30 in the lighting device 3. The distance between the imaging device 2 and the lighting device 3 in the direction of the central axis A can be set in a freely selectable manner within such a range that the lighting device 3 does not interfere with an image captured by the imaging device 2 and is designed to have high flexibility of installation.

As the imaging element 22, a CCD, a CMOS sensor, or the like can be used. The imaging element 22 receives reflected light from the measurement object W to acquire an image and outputs the acquired image data to the data processing unit 24. In this example, a high-resolution CMOS sensor is used as the imaging element 22. An imaging element capable of imaging in color can also be used. In addition to the pattern projection image, the imaging element 22 can also capture a normal luminance image. In the case of capturing the normal luminance image, it is only necessary to turn on all the LEDs 31*b*, 32*b*, 33*b*, 34*b* of the lighting device 3 and control all the LCDs 31*d*, 32*d*, 33*d*, 34*d* so as to form no pattern light. When there is observation lighting, by using this, the normal luminance image can be captured.

In addition to the camera, the imaging device 2 further includes an exposure control unit 23, a data processing unit 24, a phase calculation unit 26, an image processing unit 27, an image memory 28, and an output control unit 29. The data processing unit 24, the phase calculation unit 26, the image processing unit 27, and the image memory 28 are connected to a common bus line 25 built in the imaging device 2 and are capable of mutually transmitting and receiving data. The exposure control unit 23, the data processing unit 24, the phase calculation unit 26, the image processing unit 27, the image memory 28, and the output control unit 29 can be configured by hardware or configured by software.

(Configuration of Exposure Control Unit 23)

A trigger signal for starting imaging and a resynchronization trigger signal for synchronizing with the lighting device 3 during imaging are input from the controller 4 into the exposure control unit 23 (cf. FIG. 14). The input timing is set such that the trigger signal and resynchronization trigger signal to be input into the exposure control unit 23 have the same timing as the trigger signal and resynchronization trigger signal to be input into the lighting device 3.

The exposure control unit 23 is a unit that directly controls the imaging element 22, and controls the imaging timing and the exposure time of the imaging element 22 with the trigger signal and the resynchronization trigger signal input into the exposure control unit 23. Information on imaging conditions is input from the controller 4 into the exposure control unit 23 and stored. The information on imaging conditions includes, for example, the number of imaging times, an imaging interval (the time after imaging, the time until the next imaging is performed), the exposure time during imaging (shutter speed), and the like.

The exposure control unit 23 causes the imaging element 22 to start imaging by inputting a trigger signal transmitted from the controller 4. In the present embodiment, due to the need for generating a plurality of pattern images by inputting a single trigger signal, a resynchronization trigger signal is input from the controller 4 during imaging, and synchronization with the lighting device 3 can be performed by the input of the resynchronization trigger signal.

Specifically, as shown in the timing chart of FIG. 11, the exposure control unit 23 controls the imaging element 22 such that the imaging element 22 performs imaging (exposure) while the pattern A1 completely formed on the first LCD 31*d* is being projected onto the measurement object W as the pattern light. The exposure time and the time during which the pattern A1 is being projected onto the measurement object W as the pattern light can be made the same, but the timing of the exposure start may be slightly delayed from the timing at which projection of the pattern light is started.

Thereafter, the exposure control unit 23 controls the imaging element 22 such that the imaging element 22 performs an imaging while the pattern B1 formed on the second LCD 32*d* is being projected onto the measurement object W as the pattern light. Upon completion of this imaging, the exposure control unit 23 controls the imaging element 22 such that the imaging element 22 performs an imaging while the pattern C1 formed on the third LCD 33*d* is being projected onto the measurement object W as the pattern light. Thereafter, the exposure control unit 23 controls the imaging element 22 such that the imaging element 22 performs an imaging while the pattern D1 formed on the fourth LCD 34*d* is being projected onto the measurement object W as the pattern light. By repeating this, imaging is performed in the order of the patterns A1, B1, C1, D1, A2, B2, C2, D2, A3, . . .

In the case of projecting the pattern light only with the first LCD 31*d* and the second LCD 32*d*, imaging is performed in the order of the patterns A1, B1, A2, B2, A3, B3, . . . In the case of projecting the pattern light only with the third LCD 33*d* and the fourth LCD 34*d*, imaging is performed in the order of the patterns C1, D1, C2, D2, C3, D3, . . .

As shown in the timing chart of FIG. 11, the imaging element 22 transfers image data to the data processing unit 24 each time imaging is completed. Note that the image data can be previously stored into the image memory 28 shown in FIG. 3. That is, since the timing of imaging by the imaging element 22 and the timing of image request by the controller 4 do not match, the image memory 28 functions as a buffer to absorb this deviation.

Figure 12:
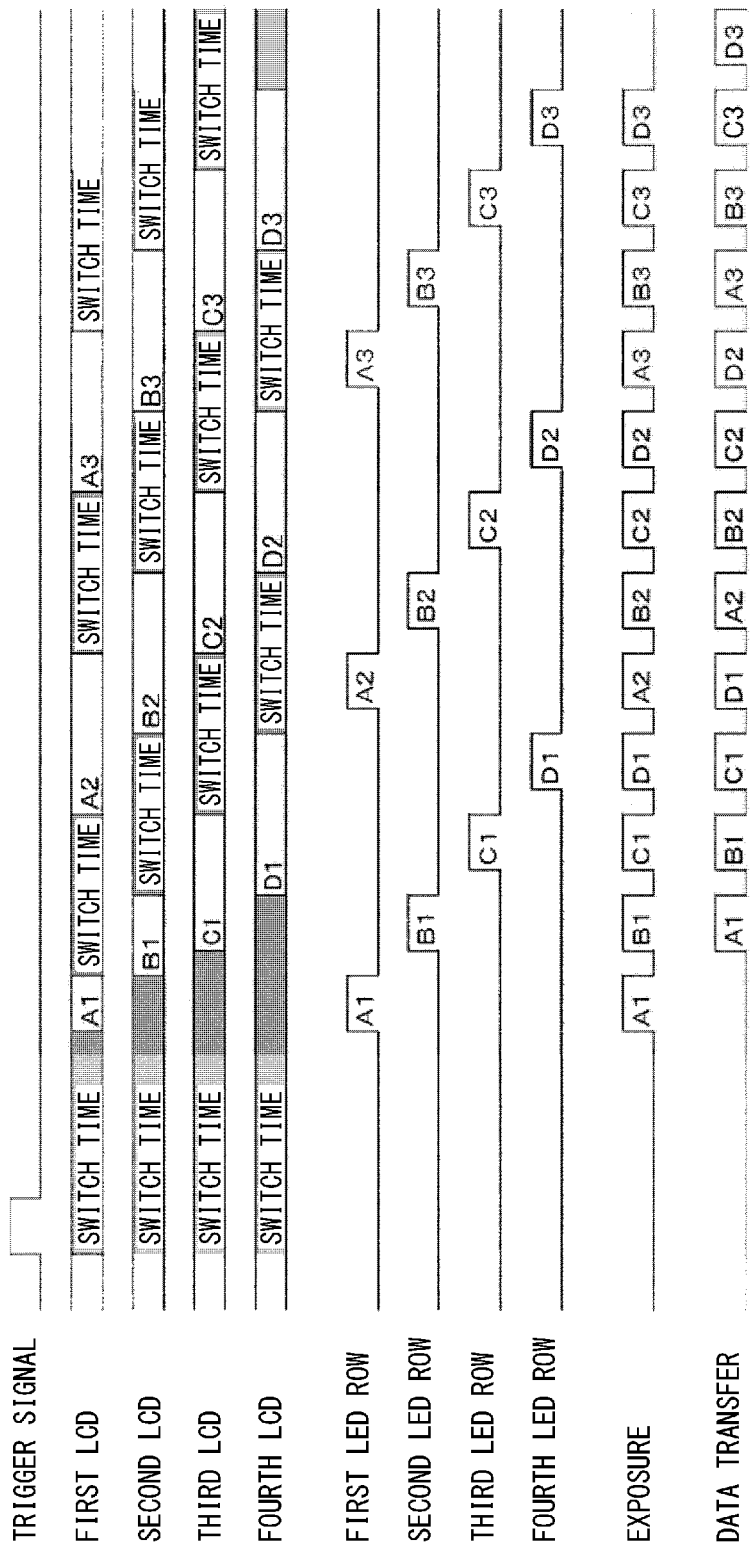
FIG. 12 is a diagram corresponding to FIG. 11 in the case of the imaging device performing exposure (imaging) and data transfer in parallel.

In the timing chart of FIG. 11, the image data is transferred to the data processing unit 24 shown in FIG. 3 between imaging and the next imaging, but the present invention is not limited to this, and for example, as shown in the timing chart of FIG. 12, imaging and data transfer can be performed in parallel. In the timing chart of FIG. 12, upon completion of imaging of the measurement object W irradiated with the pattern light of the pattern A1, the image data of the pattern A1 is transferred to the data processing unit 24 when imaging of the measurement object W irradiated with the pattern light of the next pattern B1 is being performed. In this manner, the previously captured image data can be transferred to the data processing unit 24 at the next imaging.

Figure 13:
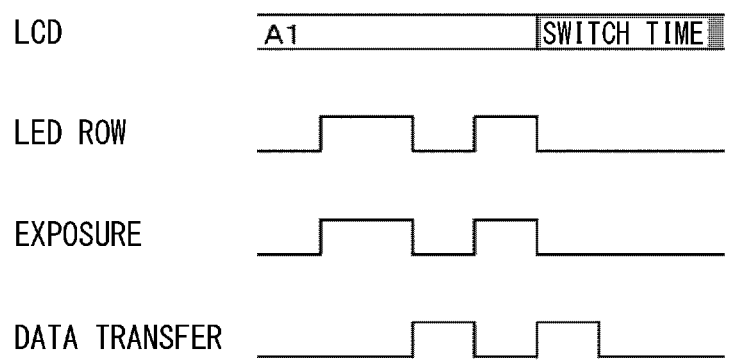
FIG. 13 is a time chart in the case of performing a high dynamic range imaging (HDR) process.

Further, as shown in the timing chart of FIG. 13, it is possible to capture an image of the measurement object W irradiated with the pattern light of the pattern A1 a plurality of times. In this case, the first LED 31*b* can be lit only during imaging by the imaging element 22. The exposure time of the imaging element 22 can be set such that the first imaging time is longer than the second imaging time, but can also be set such that the second imaging time is longer than the first imaging time. Even at the time of capturing an image of the measurement object W irradiated with pattern light of another pattern, imaging can be performed a plurality of times. This makes it possible to generate a plurality of images with different exposure times while one pattern light among a plurality of pattern lights is being projected onto the measurement object W. The plurality of images having different exposure times are used for high dynamic range processing to be described later. The first LED 31*b* may be kept on while the measurement object W irradiated with the pattern light of the pattern A1 is imaged a plurality of times.

(Configuration of Data Processing Unit 24)

The data processing unit 24 shown in FIG. 3 generates a plurality of pattern image sets based on image data output from the imaging element 22. When the imaging element 22 captures images in the order of the patterns A1, B1, C1, D1, A2, B2, C2, D2, A3, . . . shown in FIG. 11, the data processing unit 24 generates a first pattern image set composed of images of the patterns A1, A2, . . . , generates a second pattern image set composed of images of the patterns B1, B2, . . . , generates a third pattern image set composed of images of the patterns C1, C2, . . . , and generates a fourth pattern image set composed of images of the patterns D1, D2, . . . . The patterns A1, A2, . . . are pattern lights projected from the first LCD 31*d*, and the patterns B1, B2, . . . are pattern lights projected from the second LCD 32*d*, the patterns C1, C2, . . . are pattern lights projected from the third LCD 33*d*, and the patterns D1, D2, . . . are the pattern lights projected from the fourth LCD 34*d*. Therefore, the imaging device 2 can receive from the measurement object W the reflected light of the plurality of pattern lights projected from the liquid crystal panel, and can generate a plurality of pattern image sets corresponding to the respective liquid crystal panels.

When pattern lights are projected only by the first LCD 31*d* and the second LCD 32*d*, a first pattern image set and a second pattern image set are generated. When pattern lights are projected only by the third LCD 33*d* and the fourth LCD 34*d*, a third pattern image set and a fourth pattern image set are generated.

The data processing unit 24 can generate a phase shift pattern image set by projection of the pattern lights according to the phase shift method and can generate a Gray code pattern image set by projection of pattern lights according to the space code method.

The pattern light according to the phase shift method is a pattern light obtained by varying an illuminance distribution in a sinusoidal form, for example, but may be a pattern light other than this. In the present embodiment, the number of pattern lights according to the phase shift method is set to 8, but the number is not limited to this. On the other hand, the pattern light according to the space code method is a stripe pattern with its stripe width getting smaller to a half, one-quarter, . . . of a total width at a black-white duty ratio of 50%. In the present embodiment, the number of pattern lights according to the space code method is set to 4, but the number is not limited to this. Note that the pattern described in this example is a case where a Gray code is used as the space code, and it is not the purpose of the Gray code to form the pattern light by halving its stripe width, but it is formed so just as a result. In addition, the Gray code is a type of coding method that takes noise immunity into account by setting a Hamming distance to an adjacent code to 1.

Figure 9:
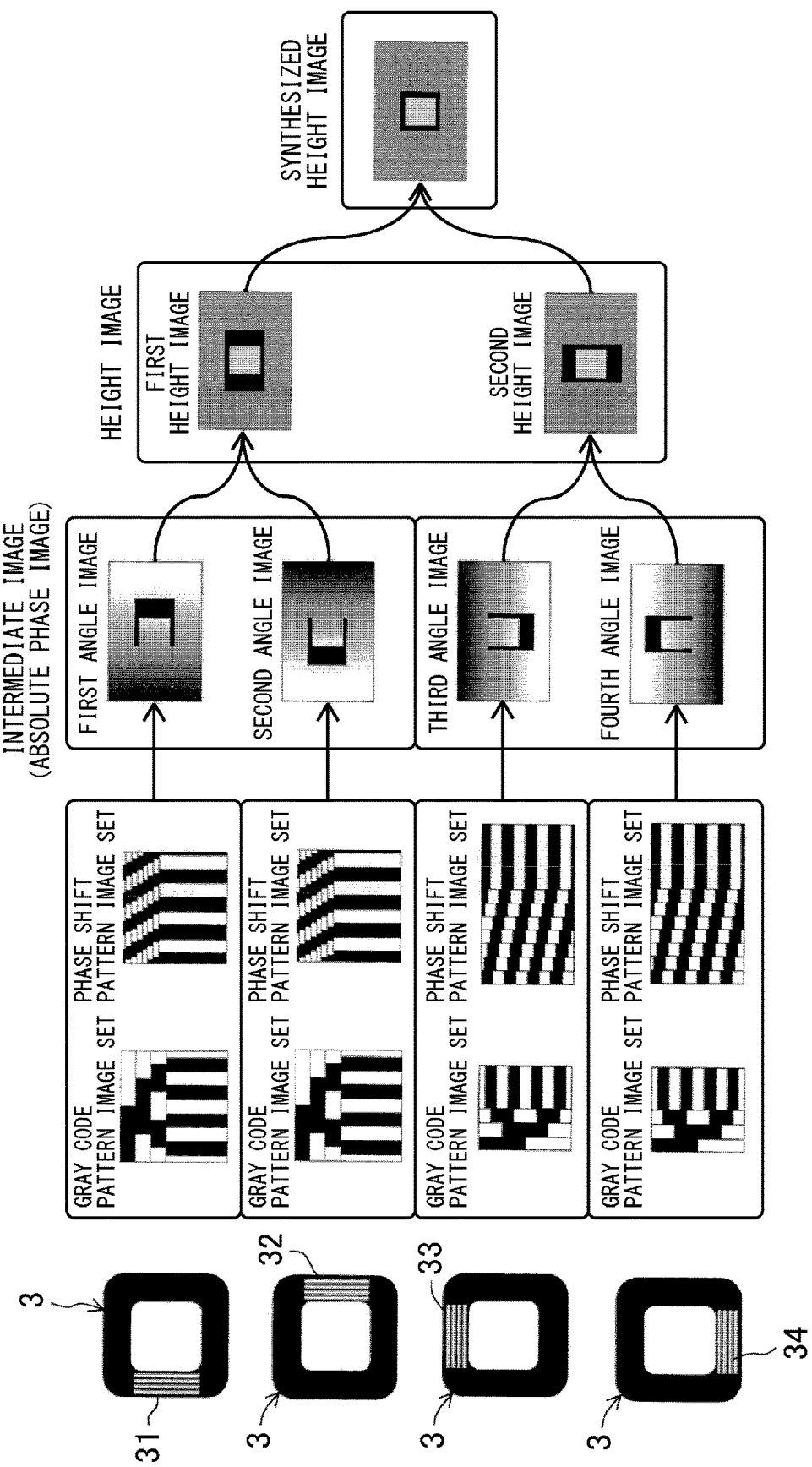
FIG. 9 is a diagram for explaining the procedure for generating the intermediate image and the reliability image from the pattern image set by using image examples.

As shown in FIG. 9, when the first light projection unit 31 of the lighting device 3 irradiates the measurement object W with four pattern lights according to the space code method, the data processing unit 24 generates the Gray code pattern image set composed of four different images. When the first light projection unit 31 of the lighting device 3 irradiates the measurement object W with eight pattern lights according to the phase shift method, the data processing unit 24 generates the phase shift pattern image set composed of eight different images. Both the Gray code pattern image set and the phase shift pattern image set obtained by irradiating the pattern light by the first light projection unit 31 are the first pattern image set.

Similarly, when the second light projection unit 32 of the lighting device 3 irradiates the measurement object W with pattern lights according to the space code method, a Gray code pattern image set is generated, and when the second light projection unit 32 irradiates the measurement object W with pattern lights according to the phase shift method, a phase shift pattern image set is generated. Both the Gray code pattern image set and the phase shift pattern image set obtained by irradiation with the pattern lights by the second light projection unit 32 are the second pattern image set.

Similarly, when the third light projection unit 33 of the lighting device 3 irradiates pattern light according to the space code method to the measurement object W, a Gray code pattern image set is generated, and a pattern according to the phase shift method When light is irradiated on the measurement object W, a phase shift pattern image set is generated. Both the Gray code pattern image set and the phase shift pattern image set obtained by irradiation with the pattern lights by the third light projection unit 33 are the third pattern image set.

Similarly, when the fourth light projection unit 34 of the lighting device 3 irradiates pattern light according to the space code method to the measurement object W, a Gray code pattern image set is generated, and a pattern according to the phase shift method When light is irradiated on the measurement object W, a phase shift pattern image set is generated. Both the Gray code pattern image set and the phase shift pattern image set obtained by irradiation with the pattern lights by the fourth light projection unit 34 are the fourth pattern image set.

Each of the pattern image sets can be previously stored into the image memory 28 shown in FIG. 3.

As shown in FIG. 3, the data processing unit 24 includes an HDR processing unit 24a. The HDR processing is a high dynamic range imaging synthesis processing, and a plurality of images with different exposure times are synthesized in the HDR processing unit 24a. That is, as shown in FIG. 13 described above, when an image of the measurement object W, with which the pattern light of the pattern A1 is being irradiated, is captured a plurality of times while varying the exposure time, a plurality of luminance images with different exposure times are obtained, and by synthesizing these luminance images, it is possible to generate an image having a dynamic range wider than a dynamic range of each luminance image. A conventionally known method can be used as an HDR synthesis method. Instead of changing the exposure time, a plurality of luminance images with different brightness may be obtained by changing the intensity of the light for irradiation, and these luminance images may be synthesized.

(Configuration of Phase Calculation Unit 26)

Figure 8:
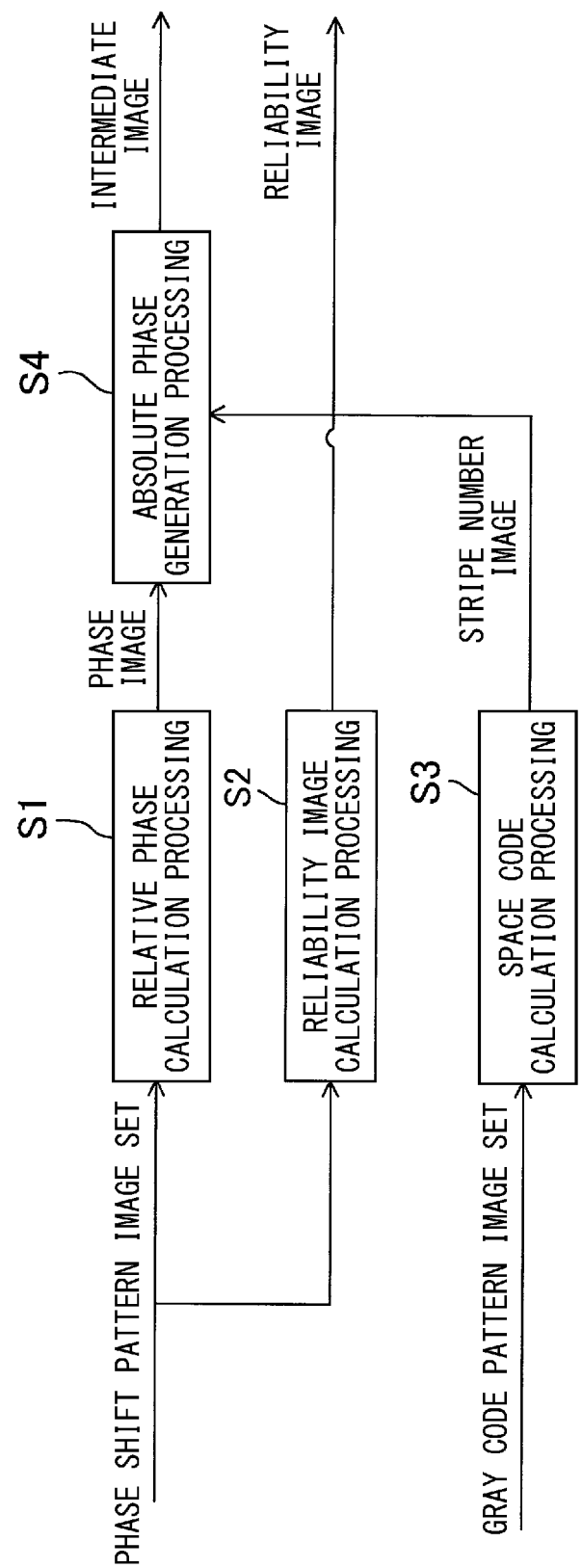
FIG. 8 is a diagram showing a procedure for generating an intermediate image and a reliability image from a pattern image set.

The phase calculation unit 26 shown in FIG. 3 is a unit that calculates an absolute phase image to become original data of a height image. As shown in FIG. 8, in step S1, each image data of the phase shift pattern image set is acquired and the relative phase calculation processing is performed by using the phase shift method. This can be expressed as a relative phase (unwrapping pre-phase) in FIG. 10, and a phase image is obtained by the relative phase calculation processing in step S1.

On the other hand, in step S3 of FIG. 8, each image data of the Gray code pattern image set is acquired, and space code calculation processing is performed by using the space code method to obtain a stripe number image. The stripe number image is an image which can be identified by numbering small spaces with a series of space code numbers when the space irradiated with light is divided into a large number of small spaces. FIG. 10 shows a procedure for numbering with the series of space code numbers.

In step S4 of FIG. 8, absolute phase generation processing is performed. In the absolute phase generation processing, an absolute phase image (intermediate image) is generated by synthesizing (unwrapping) the phase image obtained in step S1 and the stripe number image obtained in step S3. In other words, since the phase jump can be corrected (phase unwrapped) by the phase shift method based on the space code number obtained by the space code method, it is possible to obtain a high-resolution measurement result while ensuring a wide dynamic range of the height.

The height measurement may be performed only by the phase shift method. In this case, since the measurement dynamic range of the height is narrowed, the height cannot be correctly measured in the case of the measurement object W with a large difference in height such that the phase is shifted by one cycle or more. Conversely, in the case of the measurement object W with a small change in height, imaging or synthesis of stripe images by the space code method is not performed, and there is thus an advantage of increasing the speed of the processing correspondingly. For example, at the time of measuring the measurement object W with a small difference in height direction, without the need to take a large dynamic range large, even when only the phase shift method is used, it is possible to make the processing time short while keeping highly accurate height measurement performance. Also, with the absolute height being known, it may be configured such that the height can be measured only by the space code method. In this case, the accuracy can be improved by increasing the code.

Further, in step S2 of FIG. 8, each image data of the phase shift pattern image set is acquired and reliability image calculation processing is performed. In the reliability image calculation processing, a reliability image indicating the phase reliability is calculated. This is an image that can be used for determination of ineffective pixels.

The phase image, the stripe number image. and the reliability image can be previously stored into the image memory 28 shown in FIG. 3.

The absolute phase image generated by the phase calculation unit 26 can also be regarded as an angle image with each pixel having irradiation angle information of a measuring pattern light for irradiation of the measurement object W. That is, since the first pattern image set (phase shift pattern image set) includes eight first pattern images captured by shifting the phase of the sinusoidal fringe pattern, by using the phase shift method, each pixel has irradiation angle information of a measuring pattern light for irradiation of the measurement object W. That is, the phase calculation unit 26 is a unit that generates a first angle image with each pixel having irradiation angle information of a first measuring pattern light for irradiation of the measurement object W based on a plurality of first pattern images, and can thus be referred to as an angle image generation unit. The first angle image is an image obtained by converting into an image the angle of the light, with which the first LED 31b irradiates the measurement object W.

Similarly, the phase calculation unit 26 can generate a second angle image with each pixel having irradiation angle information of a second measuring pattern light for irradiation of the measurement object W based on a plurality of second pattern images, a third angle image with each pixel having irradiation angle information of a third measuring pattern light for irradiation of the measurement object W based on a plurality of third pattern images, and a fourth angle image with each pixel having irradiation angle information of a fourth measuring pattern light for irradiation of the measurement object W based on a plurality of fourth pattern images. The second angle image is an image obtained by converting into an image the angle of the light, with which the second LED 32b irradiates the measurement object W. The third angle image is an image obtained by converting into an image the angle of the light, with which the third LED 33b irradiates the measurement object W. The fourth angle image is an image obtained by converting into an image the angle of the light, with which the fourth LED 34b irradiates the measurement object W. The uppermost image of the intermediate images in FIG. 9 is the first angle image, the second uppermost image is the second angle image, the third uppermost image is the third angle image, and the lowermost image is the fourth angle image. A portion that appears to be blacked out in each angle image is a portion being a shadow of lighting (each of the LEDs) and becomes an ineffective pixel having no angle information.

(Configuration of Image Processing Unit 27)

The image processing unit 27 performs image processing such as gamma correction, white balance adjustment, and gain correction on each of the pattern image, the phase image, the stripe number image, and the reliability image. Each of the pattern image, phase image, stripe number image, and reliability image after the image processing can also be previously stored into the image memory 28. The image processing is not limited to the processing described above.

(Configuration of Output Control Unit 29)

The output control unit 29 is a unit in which, upon receipt of an image output request signal output from the controller 4, in accordance with the image output request signal, only an image indicated by the image output request signal among the images stored in the image memory 28 is output to the controller 4 via the image processing unit 27. In this example, each of the pattern image, phase image, stripe number image, and reliability image before image processing is previously stored into the image memory 28, and only an image requested by the image output request signal from the controller 4 is subjected to image processing in the image processing unit 27 and output to the controller 4. The image output request signal can be output when the user performs various measurement operations and inspection operations.

In the present embodiment, the data processing unit 24, the phase calculation unit 26, and the image processing unit 27 are provided in the imaging device 2, but the present invention is not limited to this, and may be provided in the controller 4. In this case, the image data output from the imaging element 22 is output to the controller 4 for processing.

(Configuration of Controller 4)

As shown in FIG. 2, the controller 4 includes an imaging and light projection control unit 41, a height measurement unit 42, an image synthesis unit 43, an inspection unit 45, the display control unit 46, and a history memory 47.

The controller 4 is provided separately from the imaging device 2 and the lighting device 3.

(Configuration of Imaging and Light Projection Control Unit 41)

The imaging and light projection control unit 41 outputs the formation information of the pattern light, the trigger signal, and the resynchronization trigger signal to the lighting device 3 at a predetermined timing, and outputs the information on imaging conditions, the trigger signal, and the resynchronization trigger signal to the imaging device 2 at a predetermined timing. The trigger signal and the resynchronization trigger signal output to the lighting device 3 are synchronized with the trigger signal and resynchronization trigger signal output to the imaging device 2. The formation information of the pattern light and the information on imaging conditions can be previously stored into, for example, the imaging and light projection control unit 41 or another memory (not shown). By the user performing a predetermined operation (height measurement preparation operation, inspection preparation operation), the formation information of the pattern light is output to the lighting device 3 to be temporarily stored into the light projection control unit 35 of the lighting device 3, and output to the information imaging device 2 concerning the imaging conditions to be temporarily stored into the exposure control unit 23. In this example, since the lighting device 3 is configured to control the LED and LCD with the light projection control unit 35 built in the lighting device 3, the lighting device 3 can be referred to as a smart type lighting device. In addition, since the imaging device 2 is configured to control the imaging element 22 with the exposure control unit 23 built in the imaging device 2, the imaging device 2 can be referred to as a smart type imaging device.

As thus described, when the imaging device 2 and the lighting device 3 individually perform control, the imaging timing and the lighting timing (the projection timing of the pattern light) deviate from each other as with increase in number of times of imaging, and the image obtained by the imaging device 2 becomes dark, which has been problematic. In particular, as described above, when the first pattern image set is composed of a total of twelve images, which are eight images in the phase shift pattern image set and four images in the Gray code pattern image set, and the second pattern image set is composed in the same manner and when imaging for the HDR is also performed, the number of times of imaging is increases and the deviation between the imaging timing and the lighting timing becomes remarkable.

In this example, the resynchronization trigger signal is output in synchronization with the lighting device 3 and the imaging device 2, so that it is possible to synchronize the lighting device 3 and the imaging device 2 during imaging. Therefore, even if the number of imaging times increases, the difference between the imaging timing and the lighting timing becomes extremely small to such an extent as not to cause a problem, and darkening of the image can be prevented. The resynchronization trigger signal can be output a plurality of times.

The imaging and light projection control unit 41 includes an irradiation mode switching unit 41a. It is possible to make switching to one freely selectable mode among three irradiation modes of: a first irradiation mode in which irradiation with the first measuring pattern light and the second measuring pattern light are performed respectively by the first light projection unit 31 and the second light projection unit 32; a second irradiation mode in which, after the irradiation with the first measuring pattern light and the second measuring pattern light is performed by the first light projection unit 31 and the second light projection unit 32, irradiation with the third measuring pattern light and the fourth measuring pattern light is performed respectively by the third light projection unit 33 and the fourth light projection unit 34; and a third irradiation mode in which irradiation with the third measuring pattern light and the fourth measuring pattern light is performed respectively by the third light projection unit 33 and the fourth light. projection unit 34. The irradiation mode can be switched by the user operating the console unit 6 and the mouse 7 while watching the display 5. It can also be configured such that the controller 4 automatically switches the irradiation mode.

(Configuration of Height Measurement Unit 42)

The height measurement unit 42 is configured so as to be able to measure the height of the measurement object W in the direction of the central axis A of the lighting device 3 in accordance with the irradiation angle information of each pixel in the first angle image and the irradiation angle information of each pixel in the second angle image, generated by the phase calculation unit 26, and the relative position information of the first light projection unit 31 and the second light projection unit 32 in the housing 30 of the lighting device 3.

Hereinafter, a specific method of measuring the height by the height measurement unit 42 will be described. As described above, by generating an angle image by phase Unwrap, the angle from the lighting for each pixel is determined. The first angle image is an image showing an angle of light with which the measurement object W is irradiated by the first LED 31*b*, and the second angle image is an image showing an angle of light with which the measurement object W is irradiated by the second LED 32*b*. The first LED 31*b* and the second LED 32*b* are integrally supported by the housing 30, and the distance between the first LED 31*b* and the second LED 32*b* is set to 1 (shown in FIG. 15), as described above.

In FIG. 15, the case of obtaining the height at an arbitrary point H in the measurement object W is described. A position immediately under the first LED 31*b* is assumed to be 0° and a direction of 45° from the first LED 31*b* is assumed to be 1. In addition, the right direction in FIG. 15 is assumed to be positive and the left direction is assumed to be negative. The angle of the light with which the point H is irradiated by the first LED 31*b* can be obtained from a pixel corresponding to the point H in the first angle image, and inclination of a straight line connecting the point H and the first LED 31*b* is assumed to be 1/a1. The angle of the light with which the point H is irradiated by the second LED 32*b* can be obtained from a pixel corresponding to the point H in the second angle image, and inclination of a straight line connecting the point H and the second LED 32*b* is assumed to be −1/a2. a1, a2 are phases.

$$Z=1/a1*X+0 \qquad \text{Formula 1}$$

$$Z=-1/a2*(X-1) \qquad \text{Formula 2}$$

Solving Z for Formula 1 and Formula 2 yields the height.
a1Z=X
a2Z=−X+1
Z=1/(a1+a2)
X=a1*1/(a1+a2)

In this manner, the height at each point on the measurement object W can be obtained. Since there is no variable concerning the position of the imaging device 2 in each of the above formulas, it is understood that the position of the imaging device 2 is irrelevant at the time of obtaining the height at each point on the measurement object W. However, since there is no angle information for pixels being ineffective pixels in the angle image, the height at that point cannot be obtained. That is, the calculated Z coordinate is not the distance between the imaging device 2 and the measurement object W, but the distance to the measurement object W as viewed from the lighting device 3. Irrespective of the installation position of the imaging device 2, the Z coordinate obtained based on the installation position of the lighting device 3 is determined.

Although not shown, similarly, the angle of the light with which the point H is irradiated by the third LED 33*b* can be obtained from a pixel corresponding to the point H in the third angle image, and the angle of the light with which the point H is irradiated by the fourth LED 34*b* can be obtained from a pixel corresponding to the point H in the fourth angle image, so that the height at each pixel can be obtained based on the third angle image and the fourth angle image.

For example, FIG. 9 shows a case where the height measurement unit 42 has generated a first height image representing the height of the measurement object W in accordance with the irradiation angle information of each pixel in the first angle image and the irradiation angle information of each pixel in the second angle image, and the relative position information of the first light projection unit 31 and the second light projection unit 32 in the housing 30, and a second height image representing the height of the measurement object W in accordance with the irradiation angle information of each pixel in the third angle image and the irradiation angle information of each pixel in the fourth angle image, and the relative position information of the third light projection unit 33 and the fourth light projection unit 34 in the housing 30.

The first height image enables grasp of the height at each pixel and can thus be an inspection target image to be used at the time of various inspections. The second height image also enables grasps of the height at each pixel and can thus be an inspection target image to be used at the time of various inspections. Hence the height measurement unit 42 can also be regarded as an inspection target image generation unit that generates an inspection target image based on a plurality of intermediate images.

In the case shown in FIG. 9, first, the first angle image is generated with the first pattern image set obtained by projection of the pattern lights by the first light projection unit 31, and the second angle image is generated with the second pattern image set obtained by projection of the pattern lights by the second light projection unit 32. In the first angle image, since the first light projection unit 31 irradiates the measurement object W with light from the left side, a shadow is formed on the right side of the measurement object W, and that portion is an become ineffective pixel. On the other hand, in the second angle image, since the second light projection unit 32 irradiates the measurement object W with light from the right side, a shadow is formed on the left side of the measurement object W, and that portion is an ineffective pixel. With the first height image being generated by the first angle image and the second angle image, the pixels being the ineffective pixels in one angle image are also ineffective pixels in the first height image.

Similarly, the third angle image is generated with the third pattern image set obtained by projection of the pattern lights by the third light projection unit 33, and the fourth angle image is generated with the fourth pattern image set obtained by projection of the pattern lights by the fourth light projection unit 34. In the third angle image, since the third light projection unit 33 irradiates the measurement object W with light from the upper side (upper side in the figure), a shadow is formed on the lower side of the measurement object W (the lower side in the figure), and that portion is an ineffective pixel. On the other hand, In the fourth angle image, since the fourth light projection unit 34 irradiates the measurement object W with light from the lower side, a shadow is formed on the upper side of the measurement object W (the upper side in the figure), and that portion is an ineffective pixel. With the second height image being generated by the third angle image and the fourth angle image, the pixels being the ineffective pixels in one angle image are also ineffective pixels in the second height image. In order to reduce as large a number of ineffective pixels as possible, in the present embodiment, the image synthesis unit 43 is provided in the controller 4 as shown in FIG. 2.

The case of providing the height measurement unit 42 in the controller 4 has been described in the present embodiment, but the present invention is not limited to this, and the height measurement unit may be provided in the imaging device 2, though not shown.

(Configuration of Image Synthesis Unit 43)

The image synthesis unit 43 is configured to synthesize the first height image and the second height image to generate a synthesized height image. As a result, a portion which is an ineffective pixel in the first height image and is not an ineffective pixel in the second height image is represented by an effective pixel in the synthesized height image, and a portion which, on the contrary, is an ineffective pixel in the second height image and is not an effective pixel in the first height image is represented by an effective pixel in the synthesized height image. This enables reduction in number of ineffective pixels in the synthesized height image. Conversely, when it is desired to obtain a height with high reliability, only when both the first height image and the second height image are effective and the difference therebetween is a predetermined value or smaller, an average height of those images may be taken as effective.

In other words, by irradiating the measurement object W with pattern lights from four different directions, the number of effective pixels in the height image can be increased, thereby reducing the blind spot and improving the reliability of the measurement result. In the case of the measurement object W in which the number of ineffective pixels is sufficiently reduced by irradiation of pattern lights from the two directions, only one height image may be generated. In this case, it can also be configured such that the user selects which of the first height image and the second height image is to be generated. In the case of generating only one height image, there is an advantage of shortened measurement time.

The synthesized height image also enables grasp of the height at each pixel and can thus be an inspection target image to be used at the time of various inspections. Therefore, the image synthesis unit 43 can also be regarded as an inspection target image generation unit that generates an inspection target image.

The case of providing the image synthesis unit 43 in the controller 4 has been described in the present embodiment, but the present invention is not limited to this, and the image synthesis unit may be provided in the imaging device 2, though not shown.

(Configuration of Inspection Unit 45)

The inspection unit 45 is a unit that executes inspection processing based on an arbitrary image among the first height image, the second height image, and the synthesized height image. The inspection unit 45 is provided with a presence/absence inspection unit 45a, an appearance inspection unit 45b, and a dimension inspection unit 45c, but this is an example, all of these inspection units being not essential, and an inspection unit other than these inspection units may be provided. The presence/absence inspection unit 45a is configured to be able to determine, by image processing, the presence or absence of the measurement object W, the presence or absence of a component attached to the measurement object W, and the like. The appearance inspection unit 45b is configured to be able to determine, by image processing, whether or not the outer shape or the like of the measurement object W is a pre-determined shape. The dimension inspection unit 45c is configured to be able to determine, by image processing, whether or not the dimension of each part of the measurement object W is pre-determined dimension or determine the dimension of each part. Since these methods of determination are conventionally known methods, a detailed explanation will be omitted.

(Configuration of Display Control Unit 46)

The display control unit 46 is configured to be able to display the first height image, the second height image, the synthesized height image on the display 5, and the like, and to be able to generate an operation user interface for operating the image processing apparatus 1; a setting user interface for setting the image processing apparatus 1; a height measurement result displaying user interface for displaying a height measurement result of the measurement object; a measurement result displaying user interface for displaying various inspection results of the measurement object, or the like, and display the generated user interface or the like on the display unit 5.

(Configuration of History Memory 47)

The history memory 47 can be made up of a memory device such as a RAM, for example. In the history memory 47, the first height image and the second height image output from the imaging device 2 to the controller 4, the synthesized height image, and the like can be stored previously. By the operation of the console unit 6 or the mouse 7, the image stored in the history memory 47 can be read and displayed on the display 5.

(Operation of Image Processing Apparatus 1)

Next, the operation of the image processing apparatus 1 will be described. FIGS. 16 to 20 show a case where the measurement object W is a rectangular parallelepiped box and the pattern light is projected from the first light projection unit 31 and the second light projection unit 32 and measured.

Figure 16:
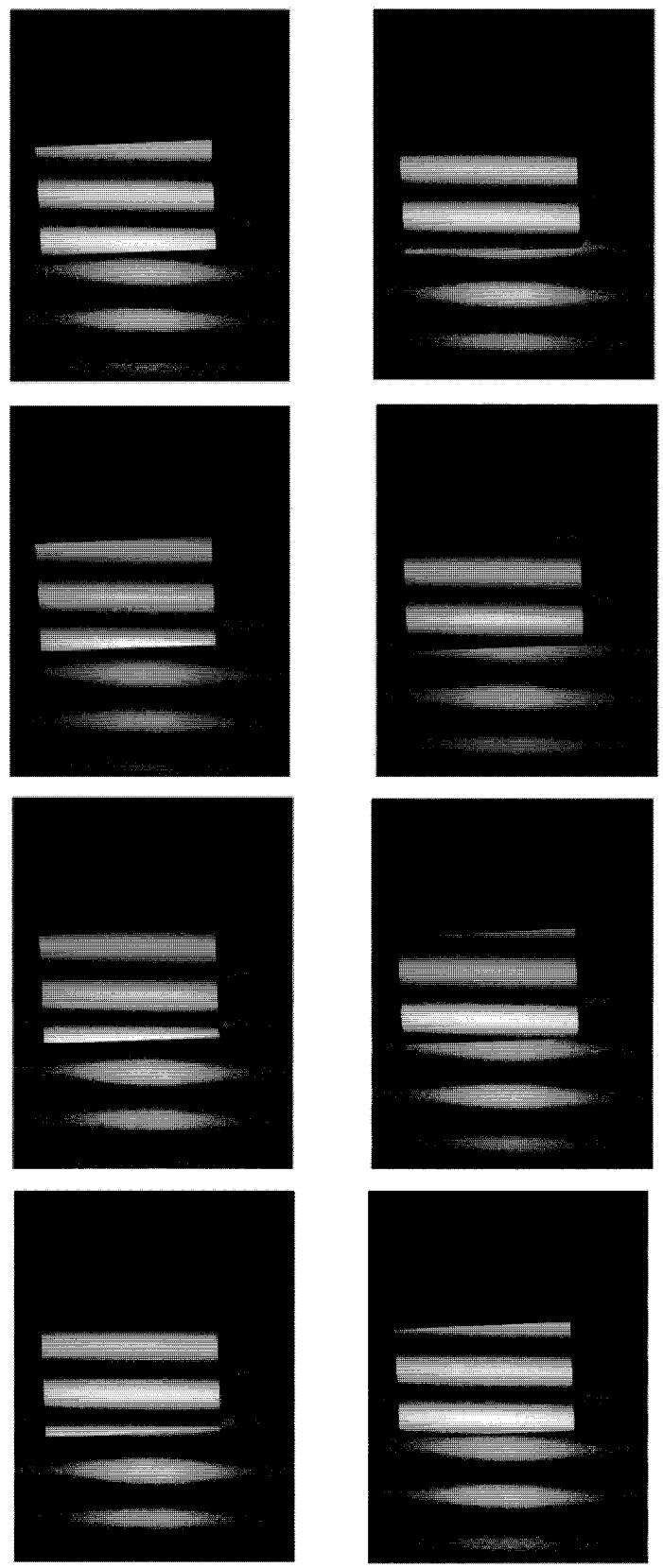
FIG. 16 is a view showing a phase shift pattern image set obtained by the first light projection unit projecting pattern lights by the first light projection unit in the case of the measurement object being a rectangular parallelepiped box.

First, when the user places the measurement object W on the placement surface 100 and performs the measurement start operation or the inspection start operation, eight pattern lights for the phase shift method from each of the first light projection unit 31 and the second light projection unit 32 are sequentially generated and projected onto the measurement object W. The imaging device 2 captures images at the timing at which each pattern light is projected. The phase shift pattern image set shown in FIG. 16 is an image obtained by capturing an image of the pattern light projected onto the measurement object W from the first light projection unit 31. When a phase image is generated based on the phase shift pattern image set shown in FIG. 16, a phase image as shown on the left side of FIG. 17 is obtained. When an intermediate image is generated from the phase image, an image as shown on the right side of FIG. 17 is obtained. Illustration of a Gray code pattern image is omitted.

Figure 18:
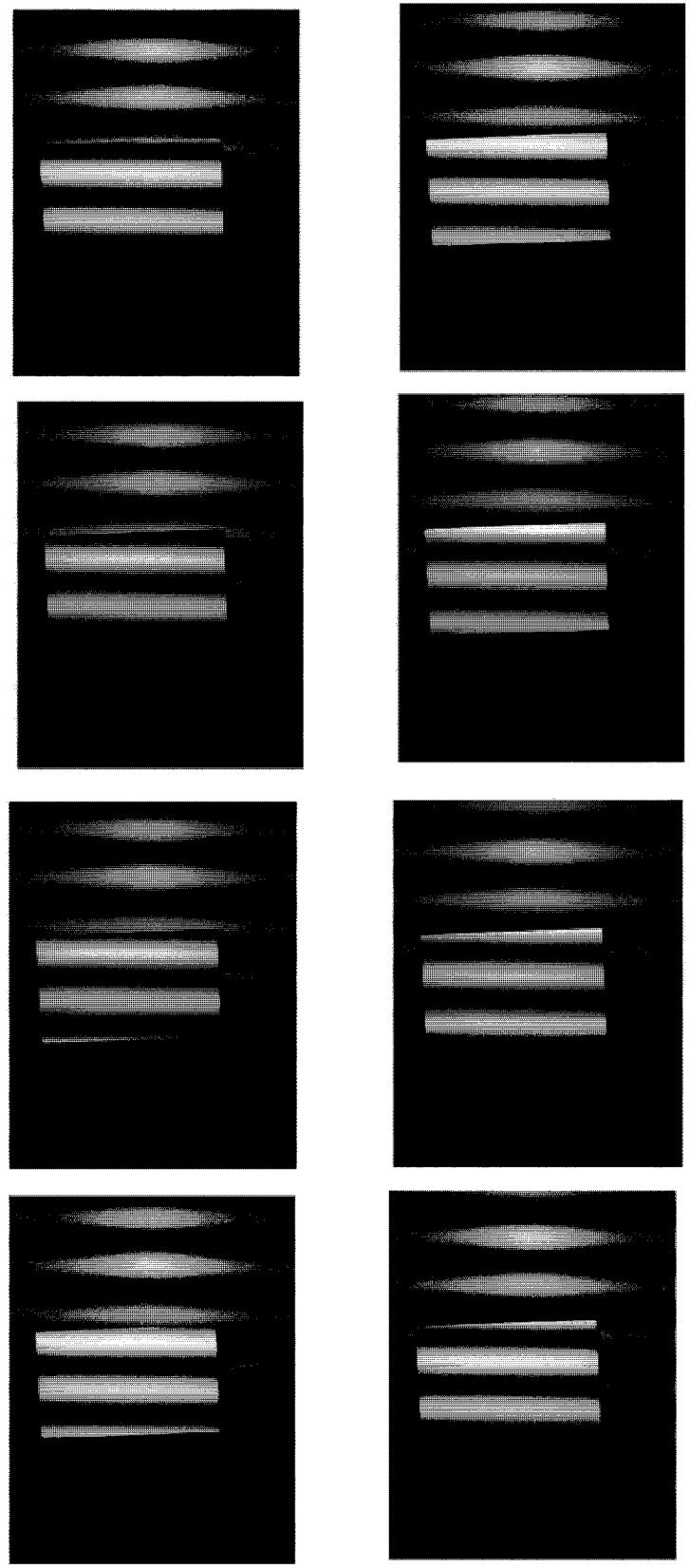
FIG. 18 is a view showing a phase shift pattern image set obtained by the second light projection unit projecting pattern lights in the case of the measurement object being a rectangular parallelepiped box.

On the other hand, the phase shift pattern image set shown in FIG. 18 is an image obtained by capturing an image of the pattern light projected onto the measurement object W from the second light projection unit 32. When a phase image is generated based on the phase shift pattern image set shown in FIG. 18, a phase image as shown on the left side of FIG. 19 is obtained. When an intermediate image is generated from the phase image, an image as shown on the right side of FIG. 19 is obtained.

When the intermediate image shown on the right side of FIG. 17 and the intermediate image shown on the right side of FIG. 19 are synthesized, a height image as shown on the left side of FIG. 20 is generated. The vertical cross-sectional shape of the height image can be displayed on the display 5 by a user interface as shown on the right side of FIG. 20.

Further, when the measurement start operation or the inspection start operation is performed, eight pattern lights for the phase shift method are sequentially generated from each of the third light projection unit 33 and the fourth light projection unit 34 and are projected onto the measurement object W. The imaging device 2 captures images at the timing at which each pattern light is projected.

(Operation and Effect of Embodiment)

As described above, according to the present embodiment, a plurality of first pattern images and a plurality of second pattern images can be generated by the first light projection unit 31 that projects the first measuring pattern light, the second light projection unit 32 that projects the second measuring pattern light, and the imaging device 2. Based on the first pattern image and the second pattern image, it is possible to generate a first angle image with each pixel having irradiation angle information of the first measuring pattern light on the measurement object W and a second angle image with each pixel having irradiation angle information of each of the second measuring pattern light on the measurement object W.

Since the relative positions of the first light projection unit 31 and the second light projection unit 32 in the housing 30 of the lighting device 3 are known, irrespective of the relative positional relation between the imaging device 2 and the lighting device 3, it is possible to measure a height of the measurement object W in the direction of the central axis A of the lighting device 3 in accordance with the relative position information, irradiation angle information of each pixel in the first angle image, and irradiation angle information of each pixel in the second angle image.

That is, when the lighting device 3 and the imaging device 2 are provided separately so as to be separately installable and to increase the flexibility at the time of installation, the absolute shape of the measurement object W can be measured even without strict adjustment of the position of the imaging device 2 with respect to the lighting device 3, so that the burden on the user at the time of installation does not increase.

Each liquid crystal panel is controlled such that, by the time of completion of projection of one pattern light from one liquid crystal panel that is projecting the one pattern light among the plurality of liquid crystal panels in the lighting device 3, formation processing of a pattern to be projected next is completed on another liquid crystal panel on which the pattern light is to be projected next. Therefore, while one liquid crystal panel is projecting a pattern light, a pattern to be projected next can be formed on another liquid crystal panel onto which a pattern light is not projected, and hence, as soon as the projection of the pattern light onto the one liquid crystal panel is completed, the pattern light can be immediately projected by another liquid crystal panel. Thus, even when the response speed of the liquid crystal panel is slow, a plurality of pattern lights are sequentially generated to enable reduction in time until projection of a plurality of pattern lights is completed.

The embodiment described above is merely an example in all respects, and should not be interpreted restrictively. Further, all variations and modifications falling within a scope equivalent to the scope of the claims are within the scope of the present invention.

For example, a program is provided which is configured to be able to cause a computer to realize each of the processing and functions described above, so that each of the processing and functions described above can be realized by the user's computer.

In addition, although the form of providing the program is not particularly limited, there are, for example, a method of providing the program by using a network such as the Internet, a method of providing a recording medium in which the program is stored, and the like; In any of the provision methods, by installing the program into the user's computer, each of the processing and functions described above can be realized.

Further, as the device for realizing each of the processing and functions described above, the program includes a general-purpose or dedicated device mounted in a state executable in the form of software, firmware, or the like. Further, a part of each of the processing and functions described above may be realized by predetermined hardware such as a gate array (FPGA, ASCI) in the form of mixture of program software and a partial hardware module realizing some elements of hardware.

In addition, each of the processes and functions described above can also be realized by combination of steps, and in this case, the user executes the image processing method.

In the above embodiment, the case where the pattern light generation unit is the liquid crystal panel has been described, but the present invention is not limited to this, and the pattern light generation unit may, for example, be a unit using a digital micromirror device (DMD), or a unit that moves a mask physically formed with a pattern. Further, the light source is not limited to a light emitting diode.

INDUSTRIAL APPLICABILITY

As described above, the image processing apparatus according to the present invention can be used, for example, in the case of measuring a height of a measurement object or in the case of inspecting the measurement object.

What is claimed is:

1. An image processing apparatus for measuring a height of a measurement object, the apparatus comprising:
   a lighting device including
      a first light projection unit provided with a first light source that emits diffused light, and a first pattern light generation unit that sequentially generates a plurality of first measuring pattern lights having different patterns by receiving diffused light emitted from the first light source, to irradiate the measurement object with the first measuring pattern lights,
      a second light projection unit provided with a second light source that emits diffused light, and a second pattern light generation unit that sequentially generates a plurality of second measuring pattern lights having different patterns by receiving diffused light emitted from the second light source, to irradiate the measurement object with the second measuring pattern lights, and
      a housing that includes an opening at a center and integrally supports the first light projection unit and the second light projection unit in a state where the first light projection unit and the second light projection unit are separated from each other in a circumferential direction of the opening;
   an imaging device that receives the first measuring pattern lights reflected from the measurement object through the opening of the housing to generate a plurality of first pattern images, and receives the second measuring pattern lights reflected from the measurement object through the opening of the housing to generate a plurality of second pattern images, wherein the imaging device is provided separately from the lighting device;
   an angle image generation unit that generates a first angle image with each pixel having irradiation angle information of the first measuring pattern lights on the measurement object based on the plurality of first pattern, images, and a second angle image with each pixel having irradiation angle information of the second measuring pattern lights on the measurement object based on the plurality of second pattern images; and
   a height measurement unit that measures a height of the measurement object in a direction of the central axis of the lighting device in accordance with irradiation angle information of each pixel in the first angle image and irradiation angle information of each pixel in the second angle image generated by the angle image generation unit, and relative position information of the first light projection unit and the second light projection unit in the housing.

2. The image processing apparatus according to claim 1, wherein the pattern changes in a one-dimensional direction, and the first light source is made up of a plurality of light emitting diodes and arranged so as to be aligned in a direction parallel to a direction in which the pattern changes.

3. The image processing apparatus according to claim 2, wherein
the lighting device further includes
a third light projection unit provided with a third light source that emits diffused light, and a third pattern light generation unit that sequentially generates a plurality of third measuring pattern lights having different patterns by receiving diffused light emitted from the third light source, to irradiate the measurement object with the third measuring pattern lights, and
a fourth light projection unit provided with a fourth light source that emits diffused light, and a fourth pattern light generation unit that sequentially generates a plurality of fourth measuring pattern lights having different patterns by receiving diffused light emitted from the fourth light source, to irradiate the measurement object with the fourth measuring pattern lights,
the third light projection unit and the fourth light projection unit are integrally supported by the housing in a state of being separated from each other in a circumferential direction of the central axis,
the imaging device receives the third measuring pattern lights reflected from the measurement object through the opening of the housing to generate a plurality of third pattern images, and receives the fourth measuring pattern lights reflected from the measurement object through the opening of the housing to generate a plurality of fourth pattern images,
the angle image generation unit generates a third angle image with each pixel having irradiation angle information of the third measuring pattern lights on the measurement object based on the plurality of third pattern images, and a fourth angle image with each pixel having irradiation angle information of the fourth measuring pattern lights on the measurement object based on the plurality of fourth pattern images, and
the height measurement unit measures a height of the measurement object in a direction of the central axis of the lighting device in accordance with irradiation angle information of each pixel in the third angle image and irradiation angle information of each pixel in the fourth angle image generated by the angle image generation unit, and relative position information of the third light projection unit and the fourth light projection unit in the housing.

4. The image processing apparatus according to claim 3, further comprising an irradiation mode switching unit capable of switching between a first irradiation mode in which irradiation is performed with the first measuring pattern lights and the second measuring pattern lights respectively by the first light projection unit and the second light projection unit, and a second irradiation mode in which irradiation is performed with the first measuring pattern lights, the second measuring pattern lights, the third measuring pattern lights, and the fourth measuring pattern lights, respectively by the first light projection unit, the second light projection unit, the third light projection unit, and the fourth light projection unit.

5. The image processing apparatus according to claim 4, wherein the irradiation mode switching unit is configured to be also able to make switching to a third irradiation mode in which irradiation is performed with the third measuring pattern lights and the fourth measuring pattern lights respectively by the third light projection unit and the fourth light projection unit.

6. The image processing apparatus according to claim 3, wherein
the height measurement unit is configured to produce a first height image representing a height of the measurement object in accordance with irradiation angle information of each pixel in the first angle image and the irradiation angle information of each pixel in the second angle image, and relative position information of the first light projection unit and the second light projection unit in the housing, and a second height image representing the height of the measurement object in accordance with irradiation angle information of each pixel in the third angle image and the irradiation angle information of each pixel in the fourth angle image, and relative position information of the third light projection unit and the fourth light projection unit in the housing, and
the image processing apparatus further comprises an image synthesis unit that synthesizes the first height image and the second height image to generate a synthesized height image.

7. The image processing apparatus according to claim 1, wherein the lighting device includes a light projection control unit that controls the first light projection unit and the second light projection unit to sequentially generate the plurality of first measuring pattern lights and the plurality of second measuring pattern lights.

* * * * *